United States Patent
Obayashi et al.

(10) Patent No.: US 6,794,469 B2
(45) Date of Patent: Sep. 21, 2004

(54) FLUORINE-CONTAINING COPOLYMER, COMPOSITION FOR FORMING A FILM, ANTI-REFLECTION FILM, AND IMAGE DISPLAY DEVICE

(75) Inventors: Tatsuhiko Obayashi, Minami-ashigara (JP); Hirohisa Hokazono, Minami-ashigara (JP); Takafumi Hosokawa, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 67 days.

(21) Appl. No.: 10/120,591

(22) Filed: Apr. 12, 2002

(65) Prior Publication Data
US 2003/0120008 A1 Jun. 26, 2003

(30) Foreign Application Priority Data

Apr. 13, 2001 (JP) ........................................ 2001-116209
Sep. 28, 2001 (JP) ........................................ 2001-301574

(51) Int. Cl.$^7$ ........................ C08F 216/04; B32B 27/28
(52) U.S. Cl. ........................ 526/247; 526/268; 526/273; 526/279; 525/326.2; 525/326.3; 525/385; 524/430; 524/436; 524/437; 524/544; 428/1.53; 428/1.55; 428/413; 428/422
(58) Field of Search .............................. 525/247, 326.2, 525/326.3, 385; 526/268, 273, 279, 247; 428/1.53, 1.55, 422, 413, 421; 524/430, 436, 437, 544

(56) References Cited

U.S. PATENT DOCUMENTS 4,703,095 A * 10/1987 Nakagawa et al. ......... 526/247
5,349,031 A * 9/1994 Kodama et al. ............ 525/386

FOREIGN PATENT DOCUMENTS

JP 8-92323 A 4/1996
JP 10-25388 A 1/1998
JP 10-147749 A 6/1998

OTHER PUBLICATIONS

Patent Abstracts of Japan Publication No. 08–092323, dated Apr. 9, 1986, *Flourine–Containing Random Copolymer.*

Patent Abstracts of Japan Publication No. 10–147749, dated Jun. 2, 1998, *Composition for Forming Film.*

Patent Abstracts of Japan Publication No. 10–025388, dated Jan. 27, 1998, *Curable Resin Composition.*

* cited by examiner

*Primary Examiner*—Fred Teskin
(74) *Attorney, Agent, or Firm*—Burns, Doane, Swecker & Mathis, L.L.P.

(57) ABSTRACT

A fluorine-containing copolymer of the following formula. A film-forming composition containing the copolymer. An anti-reflection film having a low-refractive-index layer containing the copolymer. An anti-reflection film having the above anti-reflection film on a transparent support. An image display device having the anti-reflection film. formula

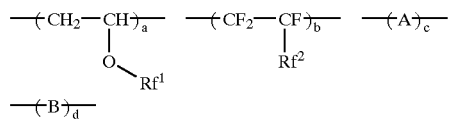

In the formula, $Rf^1$ represents a specific fluorine-containing alkyl group; $Rf^2$ represents a specific perfluoroalkyl group; A represents a constituent having at least one reactive group capable of contributing to a cross-linking reaction; B represents an arbitrary constituent; a to d each represent a mole fraction (%) of each constituent, which satisfy the following conditions:

$$55 \leq a+b \leq 95,\ 5 \leq a \leq 90,\ 5 \leq b \leq 70,\ 5 \leq c \leq 45,\ 0 \leq d \leq 40$$

20 Claims, 1 Drawing Sheet

FLUORINE-CONTAINING COPOLYMER, COMPOSITION FOR FORMING A FILM, ANTI-REFLECTION FILM, AND IMAGE DISPLAY DEVICE

FIELD OF THE INVENTION

The present invention relates to a novel fluorine-containing copolymer, an anti-reflection film, and a composition for forming a film that is usable for a coating and low dielectric constant materials useful as electric or electronic parts. Further, the present invention relates to an anti-reflection film having a low-refractive-index layer, formed by coating the composition, and it also relates to a polarizing plate and a display device (particularly a liquid crystal display device) equipped with the anti-reflection film.

BACKGROUND OF THE INVENTION

Anti-reflection films are generally provided on the surface of optical products and the like, so that reflectance is reduced on the principle of optical interference, in order to prohibit reduction in contrast owing to reflection of external light, and also not to mirror the surrounding scene on the display surface. Particularly in such image display devices as a cathode-ray tube display device (CRT), a plasma display panel (PDP), and a liquid crystal display device (LCD), each of which requires that a display image be clearly viewed, the anti-reflection film is arranged at the outermost surface of the display.

Such anti-reflection films can be prepared by a method of forming a low-refractive-index layer, having an appropriate film thickness, on a high-refractive-index layer. The low-refractive-index material preferably has as low a refractive index as possible, from the viewpoint of anti-reflection property. At the same time, the low-refractive-index material, which is used at the outermost surface of the display, is required to have high scratch resistance. To achieve high scratch resistance in a thin film of thickness about 100 nm, adhesion to the lower layer and mechanical strength of the film are important factors. In addition, materials that can be used for a wet coating are preferable, from the viewpoint of productivity.

Introduction of a fluorine atom is generally used to reduce the refractive index of the material. For example, JP-A-8-92323 ("JP-A" means unexamined published Japanese patent application), JP-A-10-147749, JP-A-10-25388 and the like each describe that curable polymers, composed of an inexpensive fluorine-containing olefin as a main component, are used for anti-reflection films.

Curable fluorine-containing olefins, as a coating having weather resistance, have also been investigated for a long time. For example, many reports have been made in JP-A-57-34107, JP-A-61-258852, JP-A-61-275311, JP-A-62-85740, JP-A-62-292848, and the like.

Hexafluoropropylene, which is used in the Examples of the above-described publications, exhibits a lower crystallinity than tetrafluoroethylene. Therefore hexafluoropropylene is preferable as a material for use in a low-refractive-index layer of the anti-reflection film, from the viewpoints of not only the lower crystallization but also the refractive index and dissolution. As described in the Journal of Polymer Science, 4(6), 481 (1952), and Nippon Kagaku Kaishi (Journal of the Chemical Society of Japan), 51(1), 112 (1980), however, said monomer is sparingly homopolymerizable in an ordinary solution radical polymerization reaction. In addition, even though hexafluoropropylene can be subjected to alternating copolymerization with a comparatively electron-donating monomer, such as vinyl ether, at most only about 50 mole % of said hexafluoropropylene can be incorporated in the polymer produced by alternating copolymerization. Therefore, there is a problem in accomplishing the purpose of sufficiently increasing the fluorine content to decrease the refractive index. On the other hand, it is possible to introduce 60 mole % or more of octafluoro-1-butene into a polymer, under specific conditions. However, there is also a problem that it is hard to incorporate 70 mole % or more of octafluoro-1-butene in a polymer, and the monomer is inferior for wide use.

The refractive index of a polymer can be reduced by reducing the component of a cross-linkable monomer having a high refractive index, while increasing the copolymerization component having a comparatively low refractive index such as ethyl vinyl ether. However, this method has a limit for use, and reduction in the density of the cross-linking group causes a disadvantage in scratch-resistance.

On the other hand, a method of increasing the fluorine content by introducing perfluoro(propyl vinyl ether) is described in the Examples of the above-described publications. However, because said monomer also exhibits the similar polymerization activity as hexafluoropropylene, it is difficult to incorporate, in a polymer, 50 mole % or more of the perfluoro(propyl vinyl ether) in a single use, or even in combination with hexafluoropropylene. Even though the fluorine content can be increased to some degree by introducing perfluoro(propyl vinyl ether), there are such problems that scratch-resistance of the thus-obtained film is remarkably reduced, and if the incorporated amount of the monomer increases, transparency of the film decreases.

Accordingly, there has been a need to develop materials for hexafluoropropylene-series copolymers that provide a high fluorine content, a low refractive index, both good dissolution in solvent and coating property, and both excellent transparency and scratch-resistance, without a reduction in the density of the cross-linking reactive group.

Further, JP-A-11-337706 describes use of fluorine-containing pre-polymers having an epoxy group, as anti-reflection films.

The hardened products of the above-described fluorine-containing olefin polymers exhibit unsatisfactory adhesion to a high-refractive-index layer, and therefore improvement in scratch resistance has been desired.

SUMMARY OF THE INVENTION

The present invention is a fluorine-containing copolymer represented by the following formula 1:

formula 1

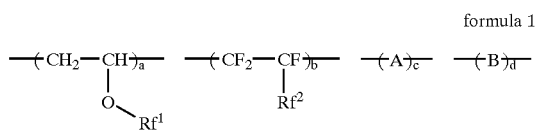

wherein, in formula 1, $Rf^1$ represents a fluorine-containing alkyl group having a straight chain, branched chain, or alicyclic structure having 1 to 30 carbon atoms, which may contain an ether bond; $Rf^2$ represents a perfluoroalkyl group having 1 to 5 carbon atoms; A represents a constituent containing at least one reactive group that is capable of contributing to a cross-linking reaction; B represents an arbitrary constituent; a to d each represent a mole fraction (%) of each constituent, in which they satisfy the following conditions:

$55 \leq a+b \leq 95, 5 \leq a \leq 90, 5 \leq b \leq 70, 5 \leq c \leq 45, 0 \leq d \leq 40$ Further, the present invention is a composition for forming a film containing the above-mentioned fluorine-containing copolymer.

Further, the present invention is an anti-reflection film having a low-refractive-index layer containing the above-mentioned fluorine-containing copolymer.

Further, the present invention is an anti-reflection film having the above-mentioned anti-reflection film on a transparent support.

Further, the present invention is a display device equipped with the above-mentioned anti-reflection film.

Other and further features and advantages of the invention will appear more fully from the following description, taken in connection with the accompanying drawings.

DETAILED DESCRIPTION OF THE INVENTION

Figure 1:
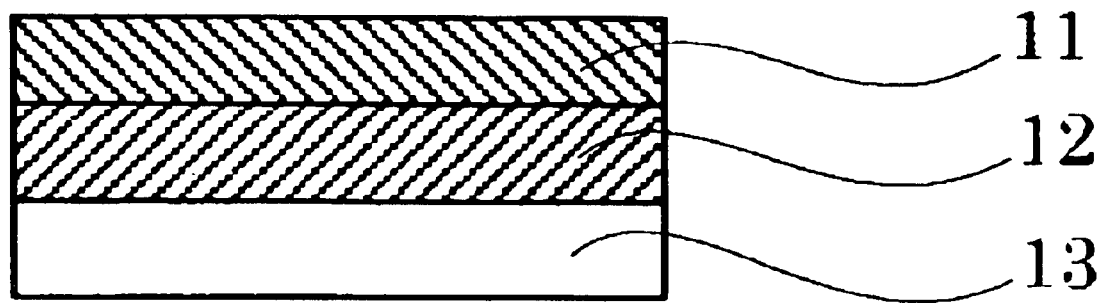
FIG. 1 is a sectional view schematically illustrating an example of the anti-reflection film of the present invention.

According to the present invention, there is provided the following means:

1) A fluorine-containing copolymer represented by the following formula 1:

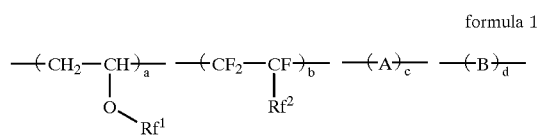

formula 1 wherein, in formula 1, $Rf^1$ represents a fluorine-containing alkyl group having a straight chain, branched chain, or alicyclic structure having 1 to 30 carbon atoms, which may contain an ether bond; $Rf^2$ represents a perfluoroalkyl group having 1 to 5 carbon atoms; A represents a constituent containing at least one reactive group that is capable of contributing to a cross-linking reaction; B represents an arbitrary constituent; a, b, c, and d each represent a mole fraction (%) of each constituent, in which they satisfy the following conditions:

$55 \leq a+b \leq 95, 5 \leq a \leq 90, 5 \leq b \leq 70, 5 \leq c \leq 45, 0 \leq d \leq 40$ 2) The fluorine-containing copolymer according to the above item 1), wherein $Rf^1$ in the formula 1 is represented by the following formula 2:

formula 2 wherein, in formula 2, $Rf^3$ represents a fluorine-containing alkyl group having a straight chain, branched chain, or alicyclic structure having 1 to 20 carbon atoms, which may contain an ether bond; p represents an integer of 0 to 5; and q represents 0 or 1.

3) The fluorine-containing copolymer according to the above item 1), wherein $Rf^1$ in the formula 1 is represented by the following formula 3:

formula 3 wherein, in formula 3, R represents a hydrogen atom, or an alkyl group having 1 to 5 carbon atoms, which may or may not contain a fluorine atom, and may have an ether bond; $Rf^4$ represents a fluorine-containing alkyl group having a straight chain, branched chain, or alicyclic structure having 1 to 14 carbon atoms, which may contain an ether bond, and in which R and $Rf^4$ may bond together to form a ring; and r represents an integer of 0 to 5.

4) The fluorine-containing copolymer according to any one of the above items 1) to 3), wherein c in the formula 1 is in the range of $25 \leq c \leq 40$.

5) The fluorine-containing copolymer according to any one of the above items 1) to 4), wherein A in the formula 1 represents a constituent of a polymer having any one selected from the group consisting of a silyl group having a hydrolysable group, a group having a reactive unsaturated double bond, and a ring-opening polymerization-reactive group.

6) The fluorine-containing copolymer according to any one of the above items 1) to 5), wherein A in the formula 1 represents a constituent of a polymer represented by the following formula 4:

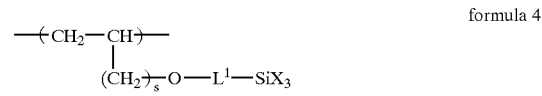

formula 4 wherein, in formula 4, $L^1$ represents an alkylene group having 1 to 20 carbon atoms; X represents a hydroxyl group or a hydrolysable group; and s represents 0 or 1.

7) The fluorine-containing copolymer according to any one of the above items 1) to 5), wherein A in the formula 1 represents a constituent of a polymer represented by the following formula 5:

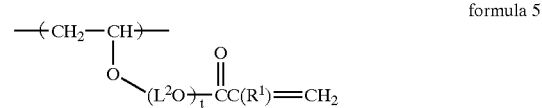

formula 5 wherein, in formula 5, $L^2$ represents a linking group having 1 to 20 carbon atoms; $R^1$ represents a hydrogen atom or a methyl group; and t represents 0 or 1.

8) The fluorine-containing copolymer according to any one of the above items 1) to 5), wherein A in the formula 1 represents a constituent of a polymer represented by the following formula 6:

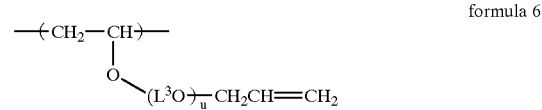

formula 6 wherein, in formula 6, $L^3$ represents a linking group having 1 to 20 carbon atoms; and u represents 0 or 1.

9) The fluorine-containing copolymer according to any one of the above items 1) to 5), wherein A in the formula 1 represents a component of a polymer represented by the following formula 7:

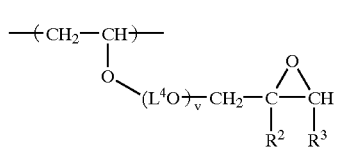

formula 7 wherein, in formula 7, $L^4$ represents a linking group having 1 to 20 carbon atoms; $R^2$ and $R^3$ each represent a hydrogen atom or a methyl group; and v represents 0 or 1.

10) The fluorine-containing copolymer according to any one of the above items 1) to 5), wherein A in the formula 1 represents a constituent of a polymer represented by the following formula 8:

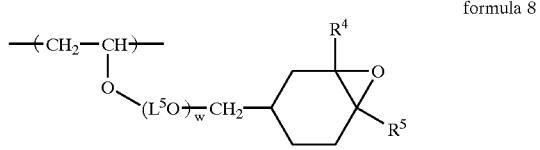

formula 8 wherein, in formula 8, $L^5$ represents a linking group having 1 to 20 carbon atoms; $R^4$ and $R^5$ each represent a hydrogen atom or a methyl group; and w represents 0 or 1.

11) A composition for forming a film, comprising the fluorine-containing copolymer according to any one of the above items 1) to 10).

12) The film-forming composition according to the above item 11), comprising inorganic fine particles.

13) The film-forming composition according to the above item 12), wherein the inorganic fine particles in the above item 12) are silica fine particles having an average particle size of 1 to 50 nm.

14) The film-forming composition according to any one of the above items 11) to 13), further comprising a hardener.

15) The film-forming composition according to the above item 14), wherein the hardener in the above item 14) is selected from the group consisting of a compound having a polymerizable vinyl group or a ring-opening polymerizable group, a silicon compound having a hydroxyl group or a hydrolysable group, and a partial condensation product of these compounds.

16) An anti-reflection film, having a low-refractive-index layer formed by coating and hardening the film-forming composition according to any one of the above items 11) to 15).

17) An anti-reflection film having the anti-reflection film according to the above item 16) on a transparent support.

18) A display device comprising the anti-reflection film according to the above item 17).

One of preferable embodiments of the present invention is the case where the constituent A of the above-described fluorine-containing copolymer has an epoxy group. Further, an anti-reflection film formed by coating and hardening a film-forming composition containing such the fluorine-containing copolymer having an epoxy group, an epoxy group-containing hardener, and fine particles, can be exemplified as one of preferable embodiments of the present invention. Such preferable embodiments of the present invention are explained below.

19) The fluorine-containing copolymer according to the above item 1), wherein said fluorine-containing copolymer is represented by the following formula 9:

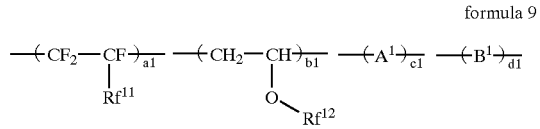

formula 9 wherein, in formula 9, $Rf^{11}$ represents a perfluoroalkyl group having 1 to 5 carbon atoms; $Rf^{12}$ represents a fluorine-containing alkyl group having a straight chain, branched chain, or alicyclic structure having 1 to 30 carbon atoms, which may contain an ether bond; $A^1$ represents a constituent having at least one epoxy group; $B^1$ represents an arbitrary constituent; a1, b1, c1, and d1 each represent a mole fraction (%) of each constituent, in which they satisfy the following conditions:

$$55 \leq a1+b1 \leq 95, 5 \leq a1 \leq 70, 5 \leq b1 \leq 90, 5 \leq c1 \leq 45, 0 \leq d1 \leq 40$$

20) The film-forming composition according to the above item 11), wherein the fluorine-containing copolymer is represented by the formula 9, and wherein the film-forming composition contains a hardener having at least one epoxy group in a molecule, and fine particles, together with said fluorine-containing copolymer.

21) The anti-reflection film according to the above item 16), wherein the fluorine-containing copolymer is represented by the formula 9, and wherein the anti-reflection film has a low-refractive-index layer formed by coating and hardening a film-forming composition, said composition containing said fluorine-containing copolymer, a hardener having at least one epoxy group in a molecule, and fine particles.

22) The anti-reflection film according to the above item 17), wherein the fluorine-containing copolymer is represented by the formula 9, and wherein the anti-reflection film has, on a transparent support, an anti-reflection film having a low-refractive-index layer formed by coating and hardening a film-forming composition, said composition containing said fluorine-containing copolymer, a hardener having at least one epoxy group in a molecule, and fine particles.

23) The display device according to the above item 18), wherein the fluorine-containing copolymer is represented by the formula 9, and wherein the display device has an anti-reflection film having, on a transparent support, an anti-reflection film having a low-refractive-index layer formed by coating and hardening a film-forming composition, said composition containing said fluorine-containing copolymer, a hardener having at least one epoxy group in a molecule, and fine particles.

24) An anti-reflection film having a low-refractive-index layer formed by coating and hardening a film-forming composition, said composition comprising:
a fluorine-containing copolymer that is obtained by polymerization of a perfluoroolefin and an epoxy group-containing vinyl monomer as essential components,
a hardener having at least one epoxy group per molecule, and
fine particles.

25) The anti-reflection film according to the above item 24), wherein said fluorine-containing copolymer is represented by formula 9:

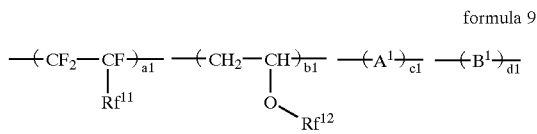

formula 9 wherein, in formula 9, $Rf^{11}$ represents a perfluoroalkyl group having 1 to 5 carbon atoms; $Rf^{12}$ represents a fluorine-containing alkyl group having a straight chain, branched chain, or alicyclic structure having 1 to 30 carbon atoms, in which said alkyl group may contain an ether bond; $A^1$ represents a component containing at least one epoxy group; $B^1$ represents an arbitrary component; a1, b1, c1, and d1 each represent a mole fraction (%) of each component, and satisfy the following conditions:

$$55 \leq a1+b1 \leq 95, 5 \leq a1 \leq 70, 5 \leq b1 \leq 90, 5 \leq c1 \leq 45, 0 \leq d1 \leq 40$$

26) The anti-reflection film according to the above item 24) or 25), wherein the epoxy group-containing hardener is a compound having 3 to 10 glycidyl groups per molecule.

27) The anti-reflection film according to any one of the above items 24) to 26), wherein the film-forming composition according to the above item 1) further comprises a compound that generates an acid on the action of radiation.

28) The anti-reflection film according to any one of the above items 24) to 27), wherein a molecular weight of the hardener is 3,000 or less.

29) The anti-reflection film according to any one of the above items 24) to 28), wherein the fine particles to be added are inorganic fine particles.

30) The anti-reflection film according to the above item 29), wherein said inorganic fine particles to be added are selected from the group consisting of $MgF_2$, $Na_3AlF_6$, a metal oxide, and silicon dioxide (silica).

31) The anti-reflection film according to any one of the above items 24) to 30), wherein an average particle diameter of the fine particles to be added is in the range of 5 to 50 nm.

32) The anti-reflection film according to any one of the above items 24) to 31), wherein a difference in refractive index between the fine particles to be added and a matrix to be added is within 0.15.

33) The anti-reflection film according to any one of the above items 24) to 32), wherein the fine particles to be added occupy 5 to 50 mass % of the whole low-refractive-index layer.

34) The anti-reflection film according to any one of the above items 24) to 33), wherein a high-refractive-index layer containing metal oxide fine particles is sandwiched between the low-refractive-index layer according to any one of the above items 24) to 33) and a support.

35) A display device comprising the anti-reflection film according to any one of the above items 24) to 34).

36) A fluorine-containing copolymer represented by the above-mentioned formula 9.

In the fluorine-containing copolymers represented by formula 1 or 9, the components are contained in the molar ratio of a, b, c, and d, and a1, b1, c1 and d1, respectively. However, the fluorine-containing copolymers of the present invention should not be construed as being limited to a specific bond style of these components (e.g., random copolymerization, block copolymerization).

The present invention is explained in detail below.

The copolymer represented by formula 1 for use in the present invention is explained.

The copolymer represented by formula 1 is a random copolymer of monomer constituents represented by the following M1 and M2, and monomer constituents for forming A and B. Each of these constituents represented by these respective formulae may be composed of a single monomer, or a plurality of monomers.

In formula 1, $Rf^1$ represents a fluorine-containing alkyl group having 1 to 30 carbon atoms, preferably 1 to 20 carbon atoms, especially preferably 1 to 15 carbon atoms. The fluorine-containing alkyl group may have a straight chain (e.g., $-CF_2CF_3$, $-CH_2(CF_2)_4H$, $-CH_2(CF_2)_8CF_3$, $-CH_2CH_2(CF_2)_4H$), a branched structure (e.g., $CH(CF_3)_2$, $CH_2CF(CF_3)_2$, $CH(CH_3)CF_2CF_3$, $CH(CH_3)(CF_2)_5CF_2H$), an alicyclic structure (preferably a 5- or 6-membered ring, e.g., a perfluorocyclohexyl group, a perfluorocyclopentyl group and alkyl groups substituted with these cyclic groups), or an ether group (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, preferably a structure illustrated by formula 3 that is explained hereinafter). $Rf^1$ may be a perfluoroalkyl group.

A preferable embodiment of $Rf^1$ is a structure represented by formula 2, especially preferably a structure represented by formula 3, from the viewpoints of synthesis suitability and adhesion to the substrate.

In formula 2, $Rf^3$ represents a fluorine-containing alkyl group having 1 to 20 carbon atoms (preferably a fluorine-containing alkyl group having 1 to 15 carbon atoms, more preferably 1 to 14 carbon atoms, especially preferably 2 to 10 carbon atoms, furthermore preferably the alkyl group having a fluorine content of not less than 60 mass %, particularly preferably not less than 70 mass %). $Rf^3$ may be a straight chain (for example, the structures mentioned above as such examples of $Rf^1$) a branch structure (for example, the structures mentioned above as such examples of $Rf^1$), or an alicyclic structure (for example, the structures mentioned above as such examples of $Rf^1$). $Rf^3$ may have an ether bond (for example, the structures mentioned above as such examples of $Rf^1$). p represents an integer of 0 to 5, preferably an integer of 0 to 3, especially preferably 0 or 1. q represents 0 or 1. $Rf^3$ may be a perfluoro group.

In formula 3, $Rf^4$ has the same meaning as the above-mentioned explanation of $Rf^3$. R represents a hydrogen atom or an alkyl group having 1 to 10 carbon atoms (preferably 1 to 5 carbon atoms), which does or does not contain a fluorine atom (e.g., $CH_3$, $CH_2CH_3$, $CH_2CF_3$), preferably a hydrogen atom or an alkyl group having 1 to 3 carbon atoms. R and $Rf^4$ may bond with each other to form a ring structure (preferably a 5- or 6-membered ring such as a perfluorocyclohexyl group, a perfluorocyclopentyl group and a perfluorotetrahydrofuryl group). r represents an integer of 0 to 5, preferably an integer of 0 to 4, more preferably an integer of 0 to 3, and especially preferably 0 or 1.

Specific examples of the monomer M1 that forms a copolymer represented by formula 1 are shown below. However, the present invention should not be limited by these examples.

$$CH_2=CH-O-CH_2CH_2OCH_2C_4F_8H\text{-}n \quad \text{M1-(1)}$$

$$CH_2=CH-O-CH_2CH_2OCH_2C_4F_9\text{-}n \quad \text{M1-(2)}$$

$$CH_2=CH-O-CH_2CH_2OCH_2C_5F_{10}H\text{-}n \quad \text{M1-(3)}$$

$$CH_2=CH-O-CH_2CH_2OCH_2C_5F_{11}\text{-}n \quad \text{M1-(4)}$$

$$CH_2=CH-O-CH_2CH_2OCH_2C_7F_{15}\text{-}n \quad \text{M1-(5)}$$

$$CH_2=CH-O-CH_2CH_2OCH_2C_8F_{16}H\text{-}n \quad \text{M1-(6)}$$

$$CH_2=CH-O-CH_2CH_2OCH_2CH_2C_{10}F_{21}\text{-}n \quad \text{M1-(7)}$$

$$CH_2=CH-O-CH_2CH_2OCH_2CH_2C_{10}F_{20}H\text{-}n \quad \text{M1-(8)}$$

$$CH_2=CH-O-CH_2CH_2O-CH_2-C_6H_{10}F \quad \text{M1-(9)}$$

$$CH_2=CH-OCH_2CH_2OCH_2CF_3 \quad \text{M1-(10)}$$

$$CH_2=CH-OCH_2CH_2OCH(CF_3)_2 \quad \text{M1-(11)}$$

$$CH_2=CH-OCH_2CH_2CH_2OCH_2C_7F_{15} \quad \text{M1-(12)}$$

$$CH_2=CH-OCH_2CH_2CH_2CH_2OCH_2C_{10}F_{21}\text{-}n \quad \text{M1-(13)}$$

$$CH_2=CH-OCH_2CH_2OCH_2CFOC_3F_7\text{-}n \; | \; CF_3 \quad \text{M1-(14)}$$

$$CH_2=CH-OCH_2CH_2OCH_2CFOCF_2CFOC_3F_7\text{-}n \; | \; CF_3 \; | \; CF_3 \quad \text{M1-(15)}$$

$$CH_2=CH-OCH_2CH_2OCH_2CH_2C_4F_8CF(CF_3)_2 \quad \text{M1-(16)}$$

$$CH_2=CH-OCH_2CH_2OCH_2C_6F_{12}CF(CF_3)_2 \quad \text{M1-(17)}$$

$$CH_2=CH-OCH_2CH_2OCH_2CF_2CHFCF_3 \quad \text{M1-(18)}$$

$$CH_2=CH-OCH_2CH_2OCHC_6F_{13}\text{-}n \; | \; CH_3 \quad \text{M1-(19)}$$

$$CH_2=CH-OCH_2CH_2OCH_2-\text{(tetrahydrofuran-F}_7\text{)} \quad \text{M1-(20)}$$

$$CH_2=CH-OCH_2CH_2OCH_2-\text{(tetrahydropyran-F}_9\text{)} \quad \text{M1-(21)}$$

$$CH_2=CH-OCH_2CH_2OCF_2CF_3 \quad \text{M1-(22)}$$

$$CH_2=CH-OCH_2CH_2OC_4F_9\text{-}n \quad \text{M1-(23)}$$

$$CH_2=CH-OCH_2OCH_2C_4F_9\text{-}n \quad \text{M1-(24)}$$

$$CH_2=CH-OCH_2C_4F_8H\text{-}n \quad \text{M1-(25)}$$

$$CH_2=CH-OCH_2C_6F_{12}H\text{-}n \quad \text{M1-(26)}$$

$$CH_2=CH-OCH_2C_7F_{15} \quad \text{M1-(27)}$$

$$CH_2=CH-OCH_2CH_2C_{10}F_{21}\text{-}n \quad \text{M1-(28)}$$

$$CH_2=CH-OCH_2-C_6H_{10}F \quad \text{M1-(29)}$$

$$CH_2=CH-OCH_2CF(CF_3)_2 \quad \text{M1-(30)}$$

$$CH_2=CH-O-CH_2CH_2CH_2C_4F_8H \quad \text{M1-(31)}$$

$$CH_2=CH-OCH_2CFOC_3F_7\text{-}n \; | \; CF_3 \quad \text{M1-(32)}$$

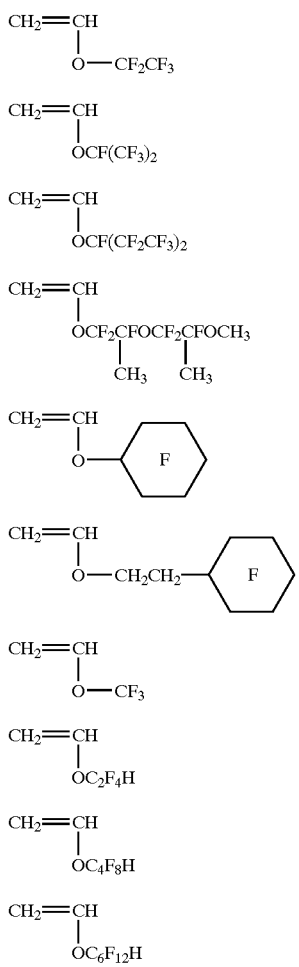

The above-described monomers represented by M1 can be synthesized according to methods such as a method of subjecting a fluorine-containing alcohol to action on a split-off group-substituted alkyl vinyl ether such as vinyloxyalkyl sulfonate and vinyloxyalkyl chloride, in the presence of a basic catalyst, as described in *Macromolecules*, 32(21), 7122 (1999), and JP-A-2-721; a method of exchanging a vinyl group by mixing a fluorine-containing alcohol with vinyl ethers such as butyl vinyl ether, in the presence of a catalyst such as palladium, as described in International Patent Application (PCT) No. 92/05135; and a method of performing a dehydrobromide reaction in the presence of an alkali catalyst, after a reaction of a fluorine-containing ketone with dibromo ethane in the presence of a potassium fluoride catalyst, as described in U.S. Pat. No. 3,420,793.

In the monomer M2 that forms a copolymer represented by formula 1, $Rf^2$ represents a perfluoroalkyl group having 1 to 5 carbon atoms. Among them, a perfluoromethyl group and a perfluoroethyl group are preferable from the viewpoint of polymerization reactivity. The perfluoromethyl group (M2 represents hexafluoropropylene) is especially preferable from the viewpoint of availability.

"A" represents a component of the monomer having at least one reactive group that is able to participate in a cross-linking reaction. Examples of the reactive group capable of participating in a cross-linking reaction include a silyl group having a hydroxyl group or a hydrolysable group (e.g., an alkoxy silyl group, an acyloxy silyl group), a group having a reactive unsaturated double bond (e.g., a (meth) acryloyl group, an allyl group, a vinyloxy group), a ring-opening polymerization reactive group (e.g., an epoxy group, an oxetanyl group, an oxazolyl group), a group having an active hydrogen atom (e.g., a hydroxyl group, a carboxyl group, an amino group, a carbamoyl group, a mercapto group, a β-ketoester group, a hydrosilyl group, a silanol group), an acid anhydride, and a group that can be substituted with a nucleophilic agent (e.g., an active halogen atom, a sulfonic acid ester).

Among these reactive groups, preferred are groups having a polymerization reactivity by themselves, more preferably a silyl group having a hydroxyl group or a hydrolysable group, a group having a reactive unsaturated double bond and a ring-opening polymerization reactive group, and especially preferably a hydrolysable silyl group, a (meth) acryloyl group, an allyl group, and an epoxy group. Particularly preferable embodiments of "A" are represented by formulae 4 to 8. The structure represented by formula 4 is especially preferable from the viewpoints of reduction in refractive index, and copolymerization reactivity with a monomer represented by M2.

In formula 4, $L^1$ represents an alkylene group having 1 to 20 carbon atoms. Said alkylene group may have a substituent (e.g., an alkyl group, an alkoxy group, a halogen atom) and/or an alicyclic structure (e.g., a cyclohexane ring), and has preferably 1 to 5 carbon atoms. Particularly an ethylene group and a propylene group are preferable. "s" represents 0 or 1, preferably 0 from the viewpoint of a polymerization reactivity. X represents a hydroxyl group or a hydrolysable group (e.g., an alkoxy group such as a methoxy group and an ethoxy group, a halogen atom such as chlorine and bromine, an acyloxy group such as an acetoxy group and a phenoxy group). A methoxy group and an ethoxy group are preferable.

The constituent represented by formula 4 can be synthesized, for example, by a method of using a hydrosilylating reaction, as described in JP-A-48-62726.

In formula 5, $L^2$ represents an alkylene group preferably having 1 to 20 carbon atoms. Said alkylene group may have a substituent (e.g., an alkyl group, an alkoxy group, a halogen atom) and/or an alicyclic structure (e.g., a cyclohexane ring), and has preferably 1 to 10 carbon atoms. Particularly an alkylene group having 2 to 5 carbon atoms is preferable. t represents 0 or 1, preferably 1. $R^1$ represents a hydrogen atom or a methyl group, preferably a hydrogen atom.

The unsaturated double bond in formula 5 may be introduced, for example, by a method of synthesizing a polymer having a hydroxyl group, followed by a reaction between the resulting polymer and an acid halide such as (meth)acrylic chloride, or an acid anhydride such as (meth) acrylic acid anhydride. Alternatively, such bond may be formed by an ordinary method such as polymerization of a vinyl monomer having a 3-chloropropionic acid ester moiety, followed by dehydrochlorination.

In formula 6, $L^3$ and u each have the same meanings as $L^2$ and t in formula 5. Similarly to the constituent represented by formula 5, the allyl group in the constituent represented by formula 6 may be introduced, for example, by a method of synthesizing a polymer having a hydroxyl group, followed by a reaction between the resulting polymer and an allyl halide.

In formula 7, $L^4$ has the same meaning as $L^2$ in formula 5. v represents 0 or 1. $R^2$ and $R^3$ each represent a hydrogen atom or a methyl group, preferably a hydrogen atom.

The constituent represented by formula 7 can be obtained by polymerization of an epoxy group-containing vinyl ether synthesized, for example, by a reaction between a vinyl ether having a hydroxyl group and an epoxy compound such as epichlorohydrin, or alternatively by a transetherification between butyl vinyl ether and glycidol in the presence of a catalyst.

$L^5$, w, $R^4$ and $R^5$ in formula 8 each have the same meanings as $L^4$, v, $R^2$ and $R^3$ in formula 7. The constituent represented by formula 8 also can be synthesized in the same manner as the constituent represented by formula 7.

Functional groups other than the above-described ones that are mentioned as particularly preferable examples of the constituent A, may be introduced into a monomer before use. Alternatively, a polymer having a reactive group such as a hydroxyl group may be introduced after polymerization.

Preferable examples of the constituent represented by A in the polymer represented by formula 1 are shown below. However, the present invention is not limited by these examples.

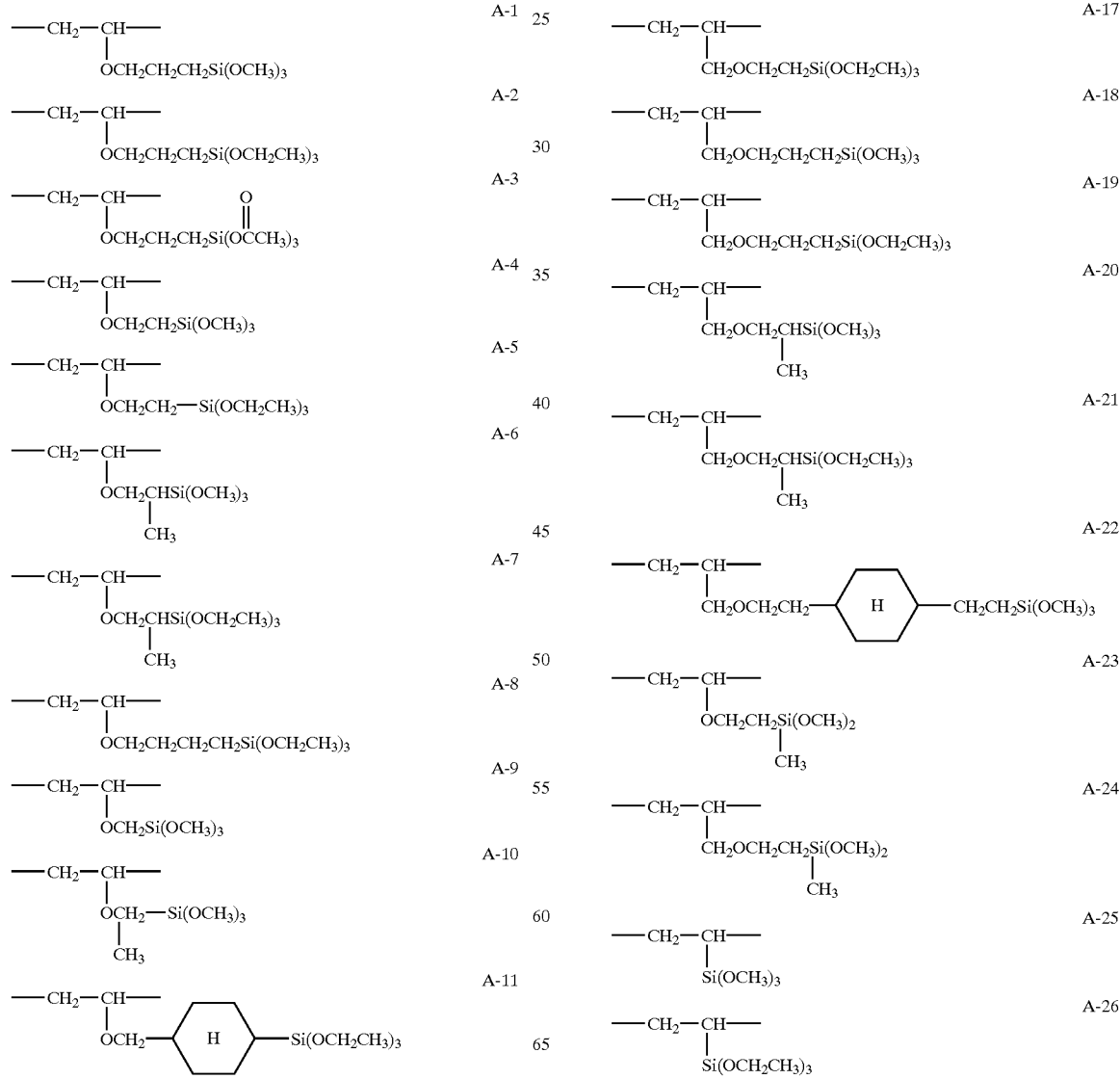

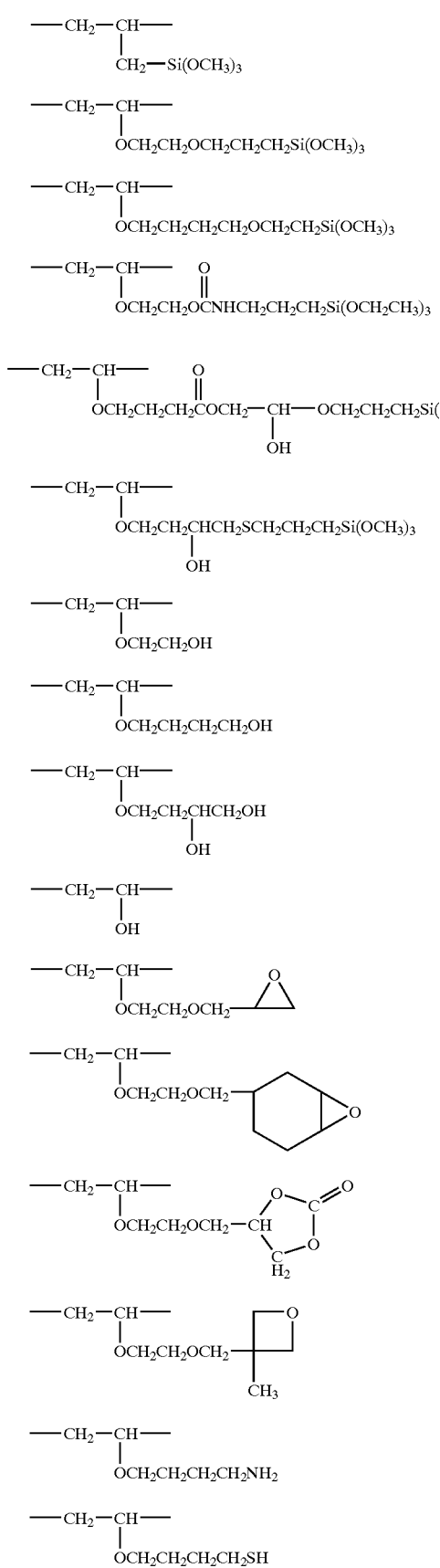
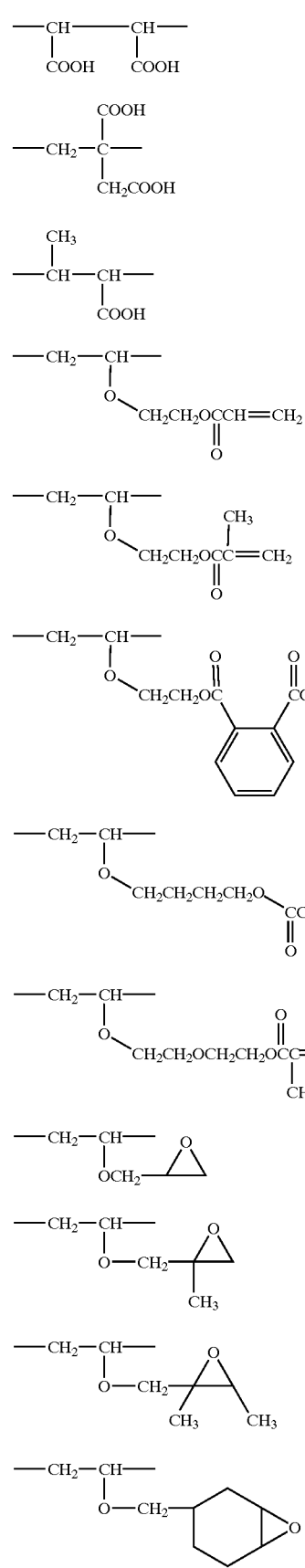

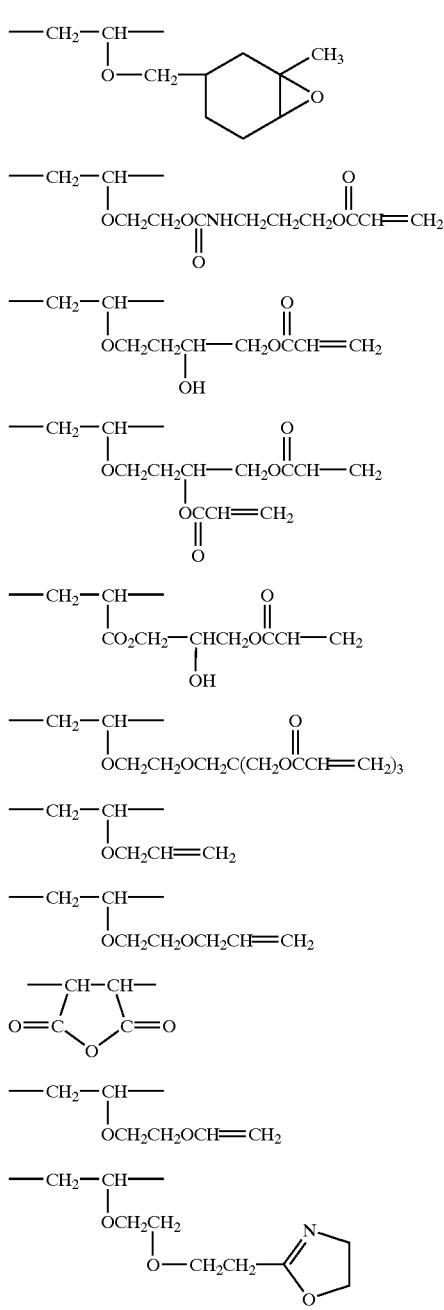

In formula 1, B represents an arbitrary constituent. B is not particularly limited so long as it is a constituent of the monomer that is able to co-polymerize with monomers represented by M1 and M2, and a monomer that forms a constituent represented by A. B can be properly selected from the viewpoints of adherence to the substrate, Tg of a polymer (the Tg contributes to a film hardness), dissolution in a solvent, transparency, slipping property, dust-proof and mud-proof properties, and the like.

Examples of B include vinyl ethers such as methyl vinyl ether, ethyl vinyl ether, n-butyl vinyl ether, cyclohexyl vinyl ether, isopropyl vinyl ether; vinyl esters such as vinyl acetate, vinyl propionate, vinyl butyrate and vinyl cyclohexanecarboxylate; and a component unit having a polysiloxane structure (for example, a component derived from an initiator VPS 1001 (trade name) manufactured by Wako Pure Chemical Industries, Ltd.).

In formula 1, a to d each represent a mole fraction (%) of each component, and are properly selected so that they satisfy the conditions:

$$55 \leq a+b \leq 95,\ 5 \leq a \leq 90,\ 5 \leq b \leq 70,\ 5 \leq c \leq 45,\ 0 \leq d \leq 40$$

In order to make a refractive index of the material lower, it is desired to increase a mole fraction (%) b of the M2 component. In an ordinary solution radical polymerization reaction, however, the mole fraction (%) b of the M2 constituent that is incorporated in the polymer is at most about 50 to 70%, and additional introduction is difficult, due to its polymerization reactivity. In the present invention, b is preferably not less than 40%, especially preferably not less than 45%.

In the present invention, a M1 constituent in addition to the M2 constituent is introduced to make the refractive index lower. A mole fraction a of the M1 constituent is preferably in the range of $10 \leq a \leq 50\%$, particularly preferably in the range of $20 \leq a \leq 40\%$.

The sum of a mole fraction (%) of the M1 constituent and a mole fraction (%) of the M2 constituent is preferably in the range of $60 \leq a+b \leq 90\%$, particularly preferably in the range of $60 \leq a+b \leq 75\%$.

If the proportion of the polymer unit represented by A is too low, a mechanical strength of the hardened film reduces. In the present invention, a mole fraction (%) of the constituent A is preferably in the range of $10 \leq c \leq 40\%$, particularly preferably in the range of $25 \leq c \leq 40\%$.

A mole fraction (%) d of the arbitrary constituent represented by B is preferably in the range of $0 \leq d \leq 20\%$, particularly preferably in the range $0 \leq d \leq 10\%$.

Specific examples of the polymer represented by formula 1 according to the present invention are shown below. However, the present invention is not limited by these examples.

Note in Tables 1 and 2 that these polymers are mentioned as a combination of monomers M1 and M2, each of which forms by polymerization a fluorine-containing constituent of formula 1; a constituent A; and a monomer Bm that forms an arbitrary constituent B.

Further, abbreviations in the tables represent the followings:
HFP: Hexafluoropropylene
PFB: Perfluoro(1-butene)
PFP: Perfluoro(1-pentene)
PFN: Perfluoro(1-nonene)
EVE: Ethyl vinyl ether
CHVE: Cyclohexyl vinyl ether
VAc: vinyl acetate

TABLE 1

| | M1 | M2 | A | Bm | a | B | c | d |
|---|---|---|---|---|---|---|---|---|
| P-1 | M1-(1) | HFP | A-1 | — | 20 | 50 | 30 | 0 |
| P-2 | M1-(1) | HFP | A-4 | — | 25 | 50 | 25 | 0 |
| P-3 | M1-(1) | HFP | A-30 | — | 30 | 50 | 20 | 0 |
| P-4 | M1-(1) | HFP | A-34 | — | 30 | 50 | 20 | 0 |
| P-5 | M1-(1) | HFP | A-37 | — | 10 | 50 | 40 | 0 |
| P-6 | M1-(1) | HFP | A-37 | — | 20 | 50 | 30 | 0 |
| P-7 | M1-(1) | HFP | A-37 | — | 30 | 50 | 20 | 0 |
| P-8 | M1-(1) | HFP | A-38 | — | 20 | 50 | 30 | 0 |
| P-9 | M1-(1) | HFP | A-39 | — | 30 | 50 | 20 | 0 |
| P-10 | M1-(1) | HFP | A-40 | — | 10 | 50 | 40 | 0 |
| P-11 | M1-(1) | HFP | A-43 | — | 40 | 50 | 10 | 0 |
| P-12 | M1-(1) | HFP | A-45 | — | 40 | 50 | 10 | 0 |
| P-13 | M1-(1) | HFP | A-46 | — | 10 | 50 | 40 | 0 |
| P-14 | M1-(1) | HFP | A-49 | — | 10 | 50 | 40 | 0 |
| P-15 | M1-(1) | HFP | A-49 | — | 20 | 50 | 30 | 0 |

TABLE 1-continued

| | M1 | M2 | A | Bm | a | B | c | d |
|---|---|---|---|---|---|---|---|---|
| P-16 | M1-(1) | HFP | A-49 | — | 30 | 50 | 20 | 0 |
| P-17 | M1-(1) | HFP | A-51 | — | 20 | 50 | 30 | 0 |
| P-18 | M1-(1) | HFP | A-54 | — | 20 | 50 | 30 | 0 |
| P-19 | M1-(5) | HFP | A-1 | — | 20 | 50 | 30 | 0 |
| P-20 | M1-(5) | HFP | A-1 | — | 30 | 50 | 20 | 0 |
| P-21 | M1-(5) | HFP | A-1 | — | 40 | 30 | 30 | 0 |
| P-22 | M1-(5) | HFP | A-1 | EVE | 30 | 35 | 25 | 10 |
| P-23 | M1-(5) | HFP | A-1 | CHVE | 20 | 50 | 25 | 5 |
| P-24 | M1-(5) | HFP | A-1 | VAc | 20 | 50 | 25 | 5 |
| P-25 | M1-(5) | HFP | A-25 | — | 40 | 50 | 10 | 0 |

With respect to the constituent A, figures shown in parentheses each represent a mole fraction (%) of the respective constituent.

TABLE 2

(continued from Table 1)

| | M1 | M2 | A | Bm | a | B | c | d |
|---|---|---|---|---|---|---|---|---|
| P-26 | M1-(5) | HFP | A-30 | — | 20 | 50 | 30 | 0 |
| P-27 | M1-(5) | HFP | A-34 | — | 20 | 50 | 30 | 0 |
| P-28 | M1-(5) | HFP | A-34 | — | 20 | 55 | 25 | 0 |
| P-29 | M1-(5) | HFP | A-34 | — | 20 | 40 | 40 | 0 |
| P-30 | M1-(5) | HFP | A-37 | — | 10 | 50 | 40 | 0 |
| P-31 | M1-(5) | HFP | A-37 | — | 20 | 50 | 30 | 0 |
| P-32 | M1-(5) | HFP | A-33 (20) A-45 (5) | — | 25 | 50 | 25 | 0 |
| P-33 | M1-(5) | HFP | A-49 | — | 5 | 50 | 45 | 0 |
| P-34 | M1-(5) | HFP | A-1 (10) A-37 (30) | — | 10 | 50 | 40 | 0 |
| P-35 | M1-(5) | HFP | A-45 (10) A-46 (30) | — | 10 | 50 | 40 | 0 |
| P-36 | M1-(5) | HFP | A-37 (10) A-49 (30) | — | 10 | 50 | 40 | 0 |
| P-37 | M1-(5) | HFP | A-63 (10) A-61 (30) | — | 10 | 50 | 40 | 0 |
| P-38 | M1-(7) | HFP | A-1 | — | 20 | 50 | 30 | 0 |
| P-39 | M1-(7) | HFP | A-34 | — | 20 | 50 | 30 | 0 |
| P-40 | M1-(8) | HFP | A-1 | — | 20 | 50 | 30 | 0 |
| P-41 | M1-(8) | HFP | A-1 | — | 5 | 50 | 45 | 0 |
| P-42 | M1-(9) | HFP | A-1 | — | 20 | 50 | 30 | 0 |
| P-43 | M1-(27) | HFP | A-1 | — | 20 | 50 | 30 | 0 |
| P-44 | M1-(30) | HFP | A-1 | — | 20 | 50 | 30 | 0 |
| P-45 | M1-(34) | HFP | A-1 | — | 20 | 50 | 30 | 0 |
| P-46 | M1-(36) | HFP | A-1 | — | 20 | 50 | 30 | 0 |
| P-47 | M1-(5) | PFB | A-1 | — | 10 | 60 | 30 | 0 |
| P-48 | M1-(5) | PFB | A-1 | CHVE | 10 | 55 | 25 | 10 |
| P-49 | M1-(5) | PFP | A-1 | — | 45 | 15 | 40 | 0 |
| P-50 | M1-(5) | PFN | A-1 | — | 50 | 10 | 40 | 0 |

With respect to the constituent A, figures shown in parentheses each represent a mole fraction (%) of the respective constituent.

The synthesis of the polymer represented by formula 1 of the present invention can be conducted according to various polymerization methods such as solution polymerization, precipitation polymerization, suspension polymerization, precipitation polymerization, mass polymerization, and emulsion polymerization. Further, at this time, synthesis can be performed according to known operations such as a batch process, a semi-continuous process and a continuous process.

As a method of initiating polymerization, known are a method of using a radical initiator and a method of irradiating light or radiation. These polymerization methods and methods of initiating polymerization are described in, for example, "Kobunshi Gosei Hoho" by Teiji Turuta, Revised Edition (published by Nikkankogyo shinbunsha, 1971) and "Kobunshi Gosei no Jikkenho" coauthored by Takayuki Ohtu and Masaetu Kinoshita (published by Kagakudojin, 1972) pp. 124 to 154.

Among these polymerization methods, solution polymerization in which a radical initiator is used is particularly preferable. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetoamide, benzene, toluene, acetonitrile, methylenechloride, chlorofolm, dichloroethane, methanol, ethanol, 1-propanol, 2-propanol and 1-butanol. These solvents may be used singly or in a combination of at least 2 kinds of solvents, or alternatively as a mixed solvent with water.

Polymerization temperature needs to be selected in relation to the molecular weight of the copolymer to be formed and the kind of an initiator and the like. Polymerization can be performed in a wide range of from 0° C. or lower to 100° C. or higher, but it is preferably performed in the range of from 50° C. to 100° C.

Reaction pressure may be optionally selected, but it is generally in the range of 1 to 100 kg/cm$^2$, particularly preferably about 1 about 30 kg/cm$^2$. Reaction time is approximately in the range of 5 to 30 hours.

The film-forming composition of the present invention may optionally contain additives such as a hardening catalyst or a hardener. Known materials for these purposes can be used. They are selected in accordance with a hardening reactivity of the part represented by A of the copolymer represented by formula 1.

The film-forming composition of the present invention contains a fluorine-containing copolymer, a hardening catalyst and a solvent. In addition, the composition may optionally contain additives or admixtures for accelerating of hardening, and enhancement of properties to the use of the polymer.

For example, in the case where the polymer of formula 1 contains a hydrolysable silyl group that acts as a part having a hardening reactivity, known acid or base catalyst that acts as a catalyst of sol-gel reaction may be mixed. Examples of these catalysts include inorganic BrΦnsted acids such as hydrochloric acid, sulfuric acid and nitric acid; organic BrΦnsted acids such as oxalic acid, acetic acid, formic acid, methane sulfonic acid and p-toluene sulfonic acid; lewis acids such as dibutyl tin dilaurate, dibutyl tin diacetate, dibutyl tin dioctate, triisopropoxy aluminum, and tetrabutoxy zirconium; inorganic bases such as sodium hydroxide, potassium hydroxide and ammonia; and organic bases such as triethylamine, pyridine, and tetramethyl ethylenediamine. Particularly acid catalysts are preferable. Among them, organic BrΦnsted acids such as p-toluene sulfonic acid, and lewis acids such as dibutyl tin dilaurate are preferable.

The addition amount of these hardening catalysts may be varied over a wide range in accordance with the kinds of the catalyst and the part having a hardening reactivity. Generally, the addition amount is preferably about 0.1 to 15 mass %, more preferably about 0.5 to 5 mass %, to the total solid content in the film-forming composition.

The film-forming composition of the present invention is stable as it is, until the composition is triggered to initiate a reaction by certain energy rays or heat.

Further, a compound that generates a hardening accelerator, such as acids and bases, by the action of light may be used from the viewpoint of storage stability of the film-forming composition. When these compounds are used, the film can be cured by the irradiation of active energy rays.

Examples of the compound that generates acids by the action of light are described in, for example, "Imeizingu yo Yuki Zairyo" edited by Yuki Erekutoronikusu Zairyo Kenkyukai (Bunshin Shuppan), pp. 187 to 194, and JP-A-10-

282644. The compounds known from these publications may be used in the present invention. Specific examples of these compounds include various kinds of onium salts such as diazonium salts, ammonium salts, phosphonium salts, iodonium salts, sulfonium salts, selenonium salts and arsonium salts, each of which has a counter ion such as $RSO_3^-$ (R represents an alkyl group, or an aryl group), $AsF_6^-$, $SbF_6^-$, $PF_6^-$ and $BF_4^-$; organic halides such as oxadiazole derivatives and s-triazine derivatives, each of which is substituted with a trihalomethyl group; organic acid esters such as o-nitrobenzyl esters, benzoin esters and imino esters; and disulfone compounds. Among these compounds, onium salts are preferable. Particularly sulfonium salts and iodonium salts are preferable. As the compound that generates bases by the action of light, known compounds also may be used. Specifically, nitrobenzyl carbamates and dinitrobenzyl carbamates can be exemplified.

In the present invention, it is particularly preferable to use the compound that generates acids by the action of light. As these compounds, sulfonic acid benzoin esters and the like can be exemplified. A sensitizing dye can be preferably used in combination with the above-mentioned compound that generates acids or bases by the action of light. The addition amount of said compound that accelerates a hardening reaction by the action of light for use in the present invention is preferably in the range of 0.1 to 15 mass %, more preferably in the range of 0.5 to 5 mass %, based on the total solid content in the film-forming composition.

In order to further accelerate hardening, a dehydrating agent may be used. Examples of the dehydrating agent include carboxylic acid orthoesters (e.g., methyl orthoformate, ethyl orthoformate, methyl orthoacetate), and acid hydrides (e.g., acetic acid anhydride).

Further, the hardener may be used in combination with another type of hardener such as organic silicates (for example, various kinds of alkoxysilane hydrolysis partial condensation products such as tetraethoxysilane and methyltrimethoxysilane), and various kinds of silane coupling agents (for example, γ-glycidoxypropyltrimethoxysilane, γ-aminopropyltrimethoxysilane, γ-methacryloyloxypropyl trimethoxysilane), as described in JP-A-61-258852.

When these hardeners are used, the addition amount of said hardener is preferably in the range of about 0.5 to about 300 mass parts, especially preferably in the range of about 5.0 to about 100 mass parts, based on 100 mass parts of the above-mentioned fluorine-containing copolymer.

In the case where the cross-linkable part represented by A in the above-mentioned formula 1 has a radical polymerizable unsaturated double bond (e.g., an acryloyl group, a methacryloyl group), addition of a radical polymerization initiator is preferable.

The radical polymerization initiator may be any one of the compound that generates radicals by the action of heat, and the compound that generates radicals by the action of light.

As the compound that initiates radical polymerization by the action of heat, for example, organic or inorganic peroxides, and organic azo or diazo compounds may be used.

Specific examples of the above-mentioned compounds include organic peroxides such as benzoyl peroxide, benzoyl halogenoperoxide, lauroyl peroxide, acetyl peroxide, dibutyl peroxide, cumene hydroperoxide, and butyl hydroperoxide; inorganic peroxides such as hydrogen peroxide, ammonium persulfate, and potassium persulfate; azo compounds such as 2-azo-bis-isobutylonitrile, 2-azo-bis-propionitrile, and 2-azo-bis-cyclohexanedinitrile; and diazo compounds such as diazoaminobenzene and p-nitrobenzene diazonium.

In case of the compound that initiates radical polymerization by the action of heat, the film is hardened by the irradiation of active energy rays.

Examples of these photo-radical polymerization initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethoxyacetophenone, 1-hydroxydimethylphenylketone, 1-hydroxycyclohexyl phenylketone, 2-methyl-4-methylthio-2-morpholinopropiophenone and 2-benzyl-2-dimethylamino-1-(4-morpholinophenyl)butanone. Examples of the benzoines include benzoine benzenesulfonic acid ester, benzoine toluenesulfonic acid ester, benzoine methylether, benzoine ethylether, and benzoine isopropylether. Examples of the benzophenones include benzophenone, 2,4-dichloro benzophenone, 4,4-dichlorobenzophenone, and p-chlorobenzo phenone. Examples of the phosphine oxides include 2,4,6-trimethylbenzoyldiphenylphosphine oxide. A sensitizing dye may be also preferably used in combination with these photo-radical polymerization initiators.

The compound that initiates radical polymerization by the action of heat or light is added in an amount enough to initiate the polymerization of a carbon—carbon double bond. Generally, the addition amount of said compound is preferably in the range of 0.1 to 15 mass %, more preferably in the range of 0.5 to 5 mass %, based on the total solid content in the film-forming composition.

In the case where the compounds represented by the above-mentioned formula 1 have an unsaturated double bond that can participate in radical polymerization, they are hardened without any other hardener. However, such an another hardener may be used in combination. Preferable examples of the hardener include multifunctional unsaturated monomers that are able to react with such unsaturated double bond (for example, (meth)acrylate monomers derived from polyhydric alcohol, such as dipentaerythritol hexa(meth)acrylate).

In the case where these hardeners are added, the addition amount of these hardeners is preferably in the range of about 0.5 to about 300 mass parts, especially preferably in the range of about 5.0 to about 100 mass parts, based on 100 mass parts of the above-mentioned fluorine-containing copolymer.

In the case where the cross linking reactive parts represented by A in the above-mentioned formula 1 has a cation polymerizable group (e.g., an epoxy group, an oxetanyl group, an oxazolyl group, a vinyloxy group), a hardening catalyst such as an acid catalyst and a photo-induced acid-generating agent that are explained hereinbefore as the hardening catalyst for the above-mentioned hydrolysable silyl group, may be added. A preferable addition amount of these hardening catalysts is also the same as the hardening catalyst for the hydrolysable silyl group.

In this case, any other hardener is not necessary to use together with the above-mentioned hardener. However, any other hardener may be properly used. Preferable hardeners are multifunctional compounds that are able to react with these cation polymerizable groups (e.g., polybasic acids such as pyromellitic acid, trimellitic acid, phthalic acid, maleic acid, and succinic acid; and compounds having a plurality of the above-mentioned cation polymerizable group in a molecule).

In this case, the addition amount of these hardeners is preferably in the range of about 0.5 to about 300 mass parts, especially preferably in the range of about 5.0 to about 100 mass parts, based on 100 mass parts of the above-mentioned fluorine-containing copolymer.

In the case where the hardening reactive part is a group having an active hydrogen atom such as a hydroxyl group, admixture of hardeners is preferable. Examples of such hardeners include polyisocyanate-series compounds, aminoplasts, polybasic acids and anhydrides of these acids.

Examples of the polyisocyanate-series compounds includes polyisocyanate compounds such as m-xylenediisocyanate, toluene-2,4-diisocyanate, hexamethylenediisocyanate, and isophoronediisocyanate; silylisocyanate compounds such as methylsilylisocyanate; partial condensation products of these isocyanate compounds; polymers of these isocyanate compounds; adducts of polyalcohol or a low molecular weight polyester film with these isocyanate compounds; and block polyisocyanate compounds in which the isocyanate group is blocked with a blocking agent such as phenol.

As the aminoplasts, use can be made of meramines, guanamines, ureas and the like. Among these compounds, preferred examples include methylol meramines in which etherification is at least partially made by one or more kinds of lower alcohol such as methanol, ethanol, propanol and butanol (e.g., hexamethyl-etherificated methylol meramine, hexabutyl-etherificated methylol meramine, methyl butyl-mixture etherificated methylol meramine, methyl-etherificated methylol meramine, butyl-etherificated methylol meramine), and condensation products of these meramines.

Examples of the polybasic acids or anhydrides of these acids include aromatic polycarboxylic acids, and anhydrides of these acids, such as pyromellitic acid, pyromellitic acid anhydride, trimellitic acid, trimellitic acid anhydride, phthalic acid, and phthalic acid anhydride; and aliphatic polycarboxylic acids or anhydrides of these acids, such as maleic acid, maleic acid anhydride, succinic acid and succinic acid anhydride.

In the present invention, the admixture amount of each ingredient may be properly selected. The addition amount of the hardener is preferably in the range of about 0.5 to about 300 mass parts, especially preferably in the range of about 5.0 to about 100 mass parts, based on 100 mass parts of the above-mentioned fluorine-containing copolymer.

Alternatively, the compounds represented by formula 1 according to the present invention and these hardeners may be previously, partially condensed before use.

In order to accelerate a hardening reaction, a catalyst that accelerates hardening may be optionally used together with the above-mentioned hardener. Examples of these catalysts include base or acid catalysts described above as the hardening catalyst for a hydrolysable silyl group. As described above, it is also preferable to use a compound that generates such catalyst by the action of light. A preferable addition amount of the catalyst is also the same as the above-mentioned hardening catalyst of the hydrolysable silyl group.

In the case where the hardening reactive part is a group that can be substituted with an acid anhydride group or a nucleophilic group, a compound that has in its molecule, a plurality of nucleophilic groups such as an amino group and a hydroxyl group is preferably used together with a hardener. At this time, a hardening catalyst may or may not be added. If added, the above-mentioned various kinds of base or acid catalysts may be used in the same amount as explained in the case where "A" is a hydrolysable silyl group. A preferable admixture amount of the hardener is the same amount as explained in the case where "A" has an active hydrogen atom.

As described above, in the above-mentioned case where the copolymer of the present invention is used together with a hardener, a compound that forms a bond together with a part represented by A in formula 1, is generally selected as a hardener. However, unless a problem arises in compatibility, a formation of the bond between the copolymer and the hardener is not always needed, so that various combinations are available. For example, a functional group of the copolymer can be selected from the viewpoint of adhesion to the substrate, while a hardener can be selected from the viewpoint of film hardness. Even though they do not directly form a bond with each other, a combination that forms a so-called IPN structure in which cross-linkable network formed by the above-mentioned copolymer and cross-linkable network formed by a hardener are mutually intricate, may be preferably selected from the viewpoints of toughness of the film, reduction in hardening shrinkage, and provision of adhesion.

As the examples of the combination of a functional group in the polymer and a functional group in the hardener, mention can be made of various ones such as an epoxy group/an acyl group, an epoxy group/an alkoxysilyl group, an epoxy group/an oxetanyl group, an acryl group/an epoxy group, an acryl group/an alkoxysilyl group, an alkoxysilyl group/an epoxy group, an alkoxysilyl group/an acryl group, a hydroxyl group/an acryl group, a hydroxyl group/an epoxy group, and a hydroxyl group/an alkoxysilyl group.

The film-forming composition of the present invention is ordinarily prepared by dissolving the copolymer represented by formula 1 in a solvent. At this time, the concentration of the copolymer may be properly varied in accordance with various uses of the copolymer. The concentration is generally about 0.01 to about 60 mass %, preferably about 0.5 to about 50 mass %, and particularly preferably about 1 to about 20 mass %.

The kind of the above-described solvent is not particularly limited so long as the composition containing the copolymer represented by formula 1 is homogeneously dissolved or dispersed in the solvent, without causing precipitation of the same. Two or more kinds of solvents may be used in combination. Preferable examples of the solvent include ketones (e.g., acetone, methylethyl ketone, methylisobutyl ketone), esters (e.g., ethyl acetate, butyl acetate), ethers (e.g., tetrahydrofuran, 1,4-dioxane), alcohols (e.g., methanol, ethanol, isopropyl alcohol, butanol, ethyleneglycol), aromatic hydrocarbons (e.g., toluene, xylene), and water.

To the film-forming composition of the present invention, fine particles such as silica and magnesium fluoride may be further added in order to improve film strength or a coating property. Addition of silica fine particles is preferable. The average particle diameter of the fine particles is generally 1 to 50 nm, preferably 5 to 50 nm, more preferably 5 to 30 nm, and especially preferably 8 to 20 nm. Such silica fine particles can be prepared by subjecting tetraalkoxysilane as a row material to hydrolysis and polymerization condensation in the presence of a catalyst such as aqueous ammonia, according to operations described by, for example, I. M. Thomas, in Appl. Opt., 25, 1481(1986). In addition, as commercially available products, SNOWTEX IPA-ST and MEK-ST (all trade names) each manufactured by Nissan Chemical Industries, Ltd. and AEROSIL 300, AEROSIL 130 and AEROSIL 50 (all trade names) each manufactured by Nippon Aerosil Co., Ltd. are available.

Addition amount of fine particles is in the range of 5 to 95 mass %, preferably in the range of generally 10 to 70 mass %, and particularly preferably in the range of 20 to 60 mass %, based on the total solid content of the coated and hardened film.

In addition, various kinds of additives such as silane coupling agents, surfactants, thickeners, leveling agents and sliding agents may be optionally added to the film-forming composition according to the present invention, if necessary.

Next, the fluorine-containing copolymer having an epoxy group that is one of preferable embodiments of the present invention, and the film-forming composition using the same are explained below.

As a result of an intensive studies, the present inventors have found that a combination of a specific fluorine-containing copolymer having an epoxy group, fine particles such as colloidal silica, and an epoxy group-containing hardener is excellent in both adhesion to a substrate and film strength, and provides high scratch resistance, and also it is preferable from the viewpoint of refractive index.

The above-described fluorine-containing copolymer containing an epoxy group that can be used in the present invention is a polymer that is obtained by copolymerization of two essential components, namely a perfluoroolefin that contributes to render the refractive index lower, and an epoxy group-containing vinyl monomer that contributes to a cross-linking reaction of a film. These monomers may be optionally copolymerized with additional vinyl monomers that meet various purposes such as lowering of refractive index and improvement in adhesion to a substrate, solubility in a solvent, transparency and a leveling property.

Examples of the perfluoroolefin include tetrafluoroethylene, hexafluoropropylene, perfluorobutene, and perfluoropentene. Among these perfluoroolefins, hexafluoropropylene is particularly preferable from the viewpoints of refractive index, solubility in a solvent, and the cost of raw material. These components preferably occupy 30 to 70 mole %, particularly preferably 40 to 60 mole % of the copolymer.

Examples of the epoxy group-containing vinyl monomer include epoxy group-containing vinyl ethers such as glycidylvinyl ether, 2-glycidyloxyrthylvinylether, β-methylglycidylvinylether, 3,4-epoxycyclohexylmethylvinylether; epoxy group-containing vinyl esters such as vinyl-3,4-epoxycyclohexanecarboxylate; epoxy group-containing allyl ethers such as allylglycidylether, 3,4-epoxycyclohexylmethyl allyl ether; and epoxy group-containing (meth)acrylates such as glycidyl (meth)acrylate, β-methylglycidyl (meth)acrylate, 3,4-epoxycyclohexylmethyl (meth)acrylate. Among these vinyl monomers, epoxy group-containing vinyl ethers and epoxy group-containing vinyl esters are preferable, and epoxy group-containing vinyl ethers are particularly preferable.

These components containing an epoxy group preferably occupy 5 to 70 mole %, more preferably 10 to 50 mole %, particularly preferably 20 to 40 mole % of the copolymer.

In the present invention, other fluorine-containing monomers and the above-mentioned essential components may be copolymerized in order to increase the fluorine content, so that refractive index is lowered. Examples of these monomer components include fluorine-containing alkylvinylethers, fluorine-containing alkylvinylesters, fluorine-containing alkylarylethers, and fluorine-containing alkyl (meth)acrylates. Among these monomers, fluorine-containing alkylvinylethers are preferable. Particularly, perfluoro(alkylvinylethers) such as perfluoro(propylvinylether), perfluoro(butylvinylether) and perfluoro(ethoxyethylvinylether), and (fluorine-containing alkyl) vinylethers (the structure represented by $CH_2=CH-ORf^{12}$ which is explained later) such as 2-(1H, 1H, 5H-perfluoropentyloxy)ethyl vinyl ether and 1H, 1H-perfluorooctylvinylether are preferable.

Two or more kinds of the above-described monomers that are introduced, except for perfluoroolefins, so as to make the refractive index lower, may be optionally combined with each other. Theسum of these monomers preferably occupies 5 to 50 mole %, particularly preferably 5 to 30 mole % of the copolymer.

Further, in the fluorine-containing copolymer having an epoxy group for use in the present invention, any vinyl monomers may be optionally copolymerized so as to meet various purposes such as improvement in adhesion to a substrate, solubility in a solvent, transparency and a leveling property.

Examples of these vinyl monomers include various kinds of vinyl ethers such as methylvinylether, ethylvinylether, n-butyl vinylether, cyclohexylvinylether, isopropylvinylether, hydroxybutyl vinyl ether and trimethoxysilylvinylether; various kinds of vinyl carboxylate esters such as vinyl acetate, vinyl propionate, vinyl butyrate, vinyl cyclohexane carboxylate, vinyl laurate and vinyl stearate; various kinds of allyl ethers such as allyl methyl ether and allyl ethyl ether; various kinds of (meth)acrylates such as methyl (meth)acrylate, ethyl (meth)acrylate, butyl (meth)acrylate and cyclohexyl (meth)acrylate; various kinds of (meth)acrylamides such as N,N-dimethylaminoethyl (meth)acrylamide and N,N-diethylaminoethyl (meth)acrylamide; vinylsilanes such as vinyltrimethoxysilane; and various kinds of α-olefins such as ethylene and propylene. Among these vinyl monomers, vinyl ethers and vinyl carboxylate esters are particularly preferable.

Two or more kinds of these copolymerizing components may be optionally combined with each other. The sum of these monomers preferably occupies 0 to 20 mole %, particularly preferably 0 to 10 mole % of the copolymer.

A preferable embodiment of the fluorine-containing copolymers containing an epoxy group for use in the present invention is the structure represented by formula 9. Said fluorine-containing copolymers are synthesized by polymerization of:

(i) a perfluoroolefin represented by $CF_2=CFRf^{11}$,
(ii) a fluorine-containing vinyl ether represented by $CH_2=CH-ORf^{12}$,
(iii) an epoxy group-containing monomer that forms "$A^1$", and
(iv) another co-polymerizable arbitrary monomer which can participate in copolymerization to form "$B^1$"). A component of each of (i) to (iv) may be used singly or in combination of two or more components.

In formula 9, $Rf^{11}$ represents a perfluoroalkyl group having 1 to 5 carbon atoms. A perfluoromethyl group and a perfluoroethyl group are preferable from the viewpoint of polymerization reactivity, and a perfluoromethyl group is particularly preferable from the viewpoint of availability.

In formula 9, the group represented by $Rf^{12}$ represents a fluorine-containing alkyl group having 1 to 30 carbon atoms, preferably 1 to 20 carbon atoms and particularly preferably 1 to 15 carbon atoms. These fluorine-containing alkyl groups may have a straight chain structure (e.g., $-CF_2CF_3$, $-CH_2(CF_2)_4H$, $-CH_2(CF_2)_8CF_3$, $-CH_2CH_2(CF_2)_4H$), or a branched structure (e.g., $-CH(CF_3)_2$, $-CH_2CF(CF_3)_2$, $-CH(CH_3)CF_2CF_3$, $-CH(CH_3)(CF_2)_5CF_2H$), or an alicyclic structure (preferably a 5- or 6-membered ring, e.g. perfluorocyclohexyl, perfluorocyclopentyl, or alkyl groups substituted with these groups), or an ether bond (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$, preferably the structure represented by formula 10 explained below).

As a preferable embodiment of $Rf^{12}$, the structure represented by formula 10 is preferable from the viewpoint of synthesis suitability and adhesion to a substrate. The structure represented by formula 11 is particularly preferable.

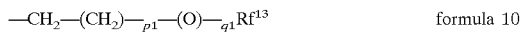  formula 10

  formula 11

In formula 10, $Rf^{13}$ represents a fluorine-containing alkyl group having 1 to 20 carbon atoms (preferably a fluorine-containing alkyl group having 1 to 15 carbon atoms, particularly preferably a fluorine-containing alkyl group having 2 to 10 carbon atoms, and furthermore preferably alkyl group having a fluorine content of 60% by mass or more, and particularly preferably 70% by mass or more). These fluorine-containing alkyl groups may have a straight chain (e.g., structures listed above as examples of $Rf^{12}$), a branched structure (e.g., structures listed above as examples of $Rf^{12}$), or an alicyclic structure (e.g., structures listed above as examples of $Rf^{12}$), or an ether bond (e.g., structures listed above as examples of $Rf^{12}$). "$p1$" represents an integer of 1 to 3, preferably 0 to 1. "$q1$" represents 0 or 1.

In formula 11, $Rf^{14}$ represents a fluorine-containing alkyl group having a straight chain, branched or alicyclic structure and having 1 to 14 carbon atoms. Further, $Rf^{14}$ may have an ether bond. $R^{11}$ represents a hydrogen atom, or an alkyl group having 1 to 10 carbon atoms, which alkyl group may or may not contain a fluorine atom (e.g., $CH_3$, $CH_2CH_3$, $CH_2CF_3$). $R^{11}$ is preferably a hydrogen atom, or an alkyl group having 1 to 3 carbon atoms. $R^{11}$ and $Rf^{14}$ may bond with each other to form a ring structure (preferably a 5- or 6-membered ring such as a perfluorocyclohexyl group, a perfluorocyclopentyl group, a perfluorotetrahydrofuryl group). "$r1$" represents an integer of 1 to 5, preferably 0 to 3, and particularly preferably 0 or 1.

Specific examples of the monomers represented by $CH_2=CH-ORf^{12}$ include examples of the monomer M1 that forms a copolymer represented by the above-described formula 1 (e.g. M1-(1) to M1-(42)). However, the present invention is not limited to these.

The above-described monomers can be synthesized according to known methods such as a method of subjecting a fluorine-containing alcohol to act on a split-off group-substituted alkyl vinyl ethers such as vinyloxyalkyl sulfonate and vinyloxyalkyl chloride in the presence of a basic catalyst, as described in *Macromolecules*, 32(21), 7122 (1999), and JP-A-2-721; a method of exchanging a vinyl group by mixing a fluorine-containing alcohol with vinyl ethers such as butylvinyl ether in the presence of a palladium catalyst, as described in International Patent Application (PCT) No. 9205135; and a method of performing a reaction of a fluorine-containing ketone with dibromo ethane in the presence of a potassium fluoride catalyst, as described in U.S. Pat. No. 3,420,793, followed by a dehydrobromide reaction in the presence of an alkali catalyst.

In formula 9, "$A^1$" represents a component having at least one epoxy group. Specific examples of the monomers that forms above-said component are the same as described in an explanation of the components of fluorine-containing copolymer according to the present invention.

"$B^1$" represents an arbitrary component that is selectively used so as to meet various purposes. Specific examples of the monomers that forms above-said component include various monomers (i.e., monomers other than $CH_2=CF_2-Rf^{11}$, $CH_2=CH-ORf^{12}$ and the "$A^1$" component) described in an explanation of the components of fluorine-containing copolymer according to the present invention.

In formula 9, a1 to d1 each represent a molar fraction of each monomer, and they are selected so that the following conditions are satisfied:

$$55 \leq a1+b1 \leq 95,\ 5 \leq a1 \leq 70,\ 5 \leq b1 \leq 90,\ 5 \leq c1 \leq 45,\ 0 \leq d1 \leq 40$$

In the present invention, "a1" is preferably 40 mole % or more, particularly preferably 45 mole % or more. "b1" is preferably in the range of $10 \leq b1 \leq 50$, particularly preferably $10 \leq b1 \leq 30$. In addition, the sum of a1 and b1 is preferably in the range of $60 \leq a1+b1 \leq 90$, particularly preferably $60 \leq a1+b1 \leq 75$.

If the proportion of the epoxy group-containing polymer unit represented by "$A^1$" is low, a mechanical strength of the hardened film becomes weak. In contrast, if the proportion of said unit is excessively high, refractive index of the fluorine-containing copolymer becomes high. In the present invention, the molar fraction c1 of the $A^1$ component is preferably in the range of $10 \leq c1 \leq 40$, particularly preferably $25 \leq c1 \leq 40$.

The molar fraction of the arbitrary polymer unit represented by "$B^1$" is preferably in the range of $0 \leq d1 \leq 20$ mole %, particularly preferably $0 \leq d1 \leq 10\%$ Specific examples of the fluorine-containing copolymer having an epoxy group which is useful for the present invention are shown below. However, the present invention is not limited to these.

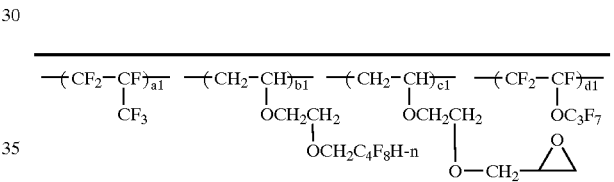

(a1, b1, c1 and d1 each represent a molar ratio of each component.)

| copolymer | a1 | b1 | c1 | d1 |
|---|---|---|---|---|
| EP-1 | 50 | 10 | 40 | 0 |
| EP-2 | 50 | 20 | 30 | 0 |
| EP-3 | 50 | 30 | 20 | 0 |
| EP-4 | 50 | 40 | 10 | 0 |
| EP-5 | 40 | 10 | 40 | 10 |
| EP-6 | 40 | 20 | 30 | 10 |
| EP-7 | 40 | 0 | 50 | 10 |
| EP-8 | 50 | 0 | 50 | 0 |

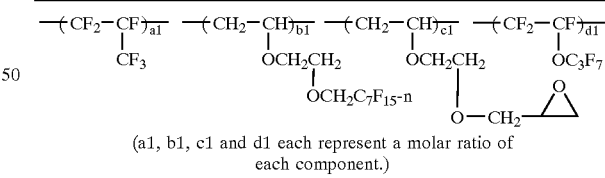

(a1, b1, c1 and d1 each represent a molar ratio of each component.)

| copolymer | a1 | b1 | c1 | d1 |
|---|---|---|---|---|
| EP-9 | 50 | 10 | 40 | 0 |
| EP-10 | 50 | 20 | 30 | 0 |
| EP-11 | 50 | 30 | 20 | 0 |
| EP-12 | 50 | 40 | 10 | 0 |
| EP-13 | 40 | 10 | 40 | 10 |
| EP-14 | 40 | 30 | 20 | 10 |

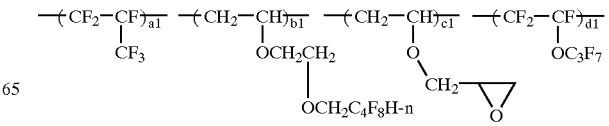

-continued (a1, b1, c1 and d1 each represent a molar ratio of each component.)

| copolymer | a1 | b1 | c1 | d1 |
|---|---|---|---|---|
| EP-15 | 50 | 30 | 20 | 0 |
| EP-16 | 50 | 40 | 10 | 0 |
| EP-17 | 40 | 10 | 40 | 10 |
| EP-18 | 40 | 30 | 20 | 10 |
| EP-19 | 50 | 10 | 40 | 0 |
| EP-20 | 50 | 20 | 30 | 0 |
| EP-21 | 50 | 0 | 40 | 10 |
| EP-22 | 50 | 0 | 50 | 0 |

$$-(CF_2-CF)_{a1}-(CH_2-CH)_{b1}-(CH_2-CH)_{c1}-(CF_2-CF)_{d1}-$$
with substituents: $CF_3$; $OCH_2CH_2$–$OCH_2C_7F_{15}n$; $O$–$CH_2$–epoxide; $OC_3F_7$ (a1, b1, c1 and d1 each represent a molar ratio of each component.)

| copolymer | a1 | b1 | c1 | d1 |
|---|---|---|---|---|
| EP-23 | 50 | 30 | 20 | 0 |
| EP-24 | 50 | 40 | 10 | 0 |
| EP-25 | 40 | 10 | 40 | 10 |
| EP-26 | 40 | 30 | 20 | 10 |
| EP-27 | 50 | 10 | 40 | 0 |
| EP-28 | 50 | 20 | 30 | 0 |

$$-(CF_2-CF)_{50}-(CH_2-CH)_{30}-(CH_2-CH)_{20}-$$
with substituents $CF_3$, $O$-Rf, $O$-Ep

| copolymer | Rf | Ep |
|---|---|---|
| EP-29 | $CH_2CH_2C_8F_{16}H$-n | (epoxide) |
| EP-30 | $CH_2C_8F_{17}$-n | (epoxide) |
| EP-31 | $CH_2CH_2OCH_2C_{10}F_{21}$-n | (epoxide) |
| EP-32 | $CH_2CH_2OCH_2CH_2C_8F_{16}H$-n | (epoxide) |
| EP-33 | $CH_2CH_2OCH_2CF_2OCF_2CF_3$-n | (epoxide) |
| EP-34 | $CH_2CH_2CH_2OCH_2C_4F_8H$-n | (epoxide) |
| EP-35 | $CH_2CH_2OCH(CH_3)C_4F_8H$-n | (epoxide) |
| EP-36 | | |
| EP-37 | $CH_2CH_2OCH_2C_4F_8H$-n | (cyclohexene oxide) |
| EP-38 | $CH_2CH_2OCH_2C_4F_8H$-n | (epoxide) |
| EP-39 | $CH_2CH_2OCH_2C_4F_8H$-n | (acetyl-cyclohexene oxide) |

$$-(CF_2-CF)_{50}-(CH_2-CH)_{30}-(CH_2-CH)_{20}-$$
with substituents $CF_3$, $R^{12}$, $O$-Ep

| copolymer | $R^{12}$ | Ep |
|---|---|---|
| EP-40 | $OCH_2CH_3$ | (epoxide) |
| EP-41 | $OCH_2CH_2CH_2CH_2OH$ | (epoxide) |
| EP-42 | $OCH_2CH_2Si(OCH_3)_3$ | (epoxide) |
| EP-43 | $OCOCH_3$ | (epoxide) |
| EP-44 | $COOCH_2CH_3$ | (epoxide) |
| EP-45 | $COOCH_2C_4F_9$-n | (epoxide) |

$$-(CF_2-CF)_{50}-(CH_2-CH)_{10}-(CH_2-CH)_{40}-$$
with substituents Rf, $OCH_2CH_2$–$OCH_2C_4F_8H$-n, $OCH_2CH_2$–$O$–$CH_2$–epoxide

| copolymer | Rf |
|---|---|
| EP-46 | $C_2F_5$-n |
| EP-47 | $C_3F_7$-n |
| EP-48 | $C_4F_9$-n |

Similarly to the above, the fluorine-containing copolymer having an epoxy group that can be used in the present invention can be synthesized according to various polymerization methods such as solution polymerization, suspension polymerization, precipitation polymerization, mass polymerization, and emulsion polymerization. Further, at this time, synthesis can be performed according to known operations such as a batch process, a semi-continuous process and a continuous process.

As a method of initiating polymerization, known are, for example, a method of using a radical initiator and a method of irradiating light or radiation. These polymerization methods and polymerization-initiating methods are described in, for example, "Kobunshi Gosei Hoho" by Teiji Turuta, Revised Edition (published by Nikkankogyo Shinbunsha, 1971) and "Kobunshi Gosei no Jikkenho" coauthored by Takayuki Ohtu and Masaetu Kinoshita (published by Kagakudojin, 1972) pp. 124 to 154.

Among these polymerization methods, a solution polymerization in which a radical initiator is used is particularly preferable. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N- dimethylacetoamide, benzene, toluene, acetonitrile, methylenechloride, chlorofolm, dichloroethane, methanol, ethanol, 1-propanol, 2-propanol and 1-butanol. These organic solvents may be used singly or in a combination of at least 2 kinds of the solvents, or alternatively as a mixed solvent with water.

Polymerization temperature needs to be selected in relation to the molecular weight of the polymer to be formed and the kind of an initiator, and the like. Polymerization can be performed in a wide range of from 0° C. or lower to 100° C. or higher, but it is preferably performed in the range of from 50° C. to 100° C.

Reaction pressure may be optionally selected, but it is generally in the range of 1 to 100 kg/cm$^2$, particularly preferably about 1 to 30 kg/cm$^2$. Reaction time is approximately in the range of 5 to 30 hours.

In the present invention, a compound having a plurality of epoxy groups in a molecule is preferably used as a hardener, together with the above-mentioned fluorine-containing copolymer having an epoxy group. As such hardener, compounds having a plurality of glycidyl groups or 3,4-epoxycyclohexyl groups in a molecule are well known, and these compounds are useful for the present invention. Among these compounds, hardeners having glycidyl groups are particularly preferable from the viewpoint of solution stability during storage. Besides, aliphatic compounds are particularly preferable from the viewpoint of refractive index. As the epoxy hardener, compounds having about 3 to 10 glycidyl groups are particularly preferable from the viewpoint of good efficiency of hardening due to not only a high density of functional groups, but also a moderate mobility owing to a moderate molecular weight.

The number of an epoxy group in a molecule is preferably 2 to 10, particularly preferably 3 to 5. A molecular weight of said hardener is generally 3,000 or less, preferably in the range of 200 to 2,000, and particularly preferably in the range of 400 to 1,500. If the molecular weight is too low, it causes a problem of volatilization during film formation. In contrast, if the molecular weight is too high, it impairs compatibility with a fluorine-containing polymer.

Examples of the hardener that can be preferably used in the present invention include commercially available products such as DENACOL EX 314, 411, 421, 521, 611 and 612 etc. (manufactured by NAGASE KASEI Chemical Ltd., all trade names) and CELOXIDE GT301 and 401 etc. (manufactured by Daisel Chemical Industies, Ltd., all trade names).

Specific examples of the hardener that is useful in the present invention are shown below. However, the present invention is not limited to these.

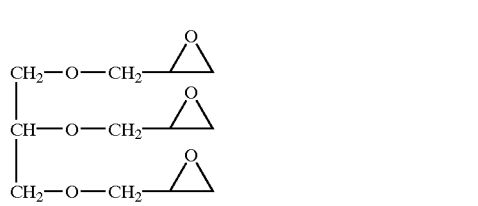

EA-1

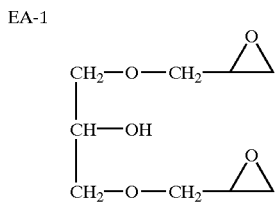

EA-2

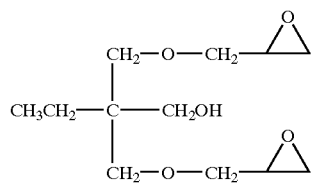

EA-3

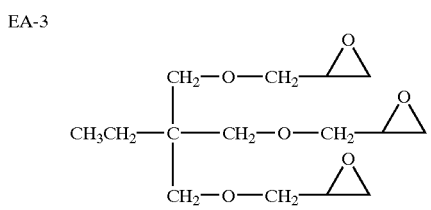

EA-4

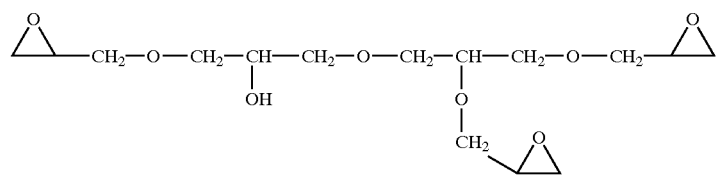

EA-5

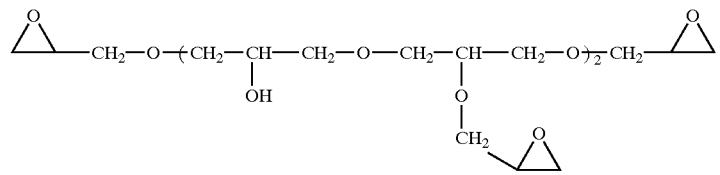

EA-6

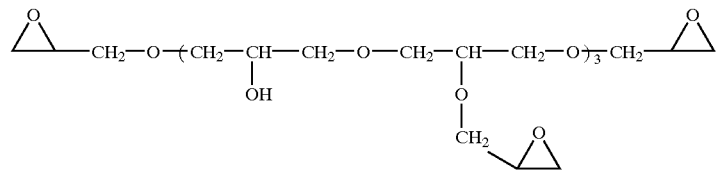

EA-7

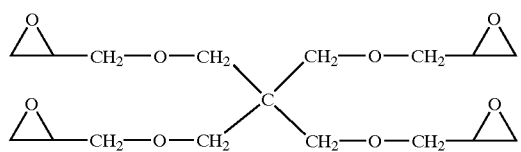
EA-8
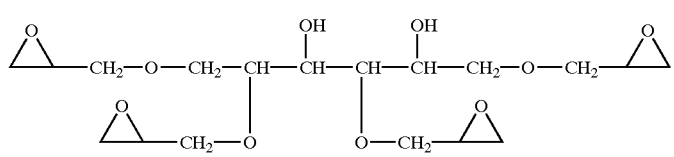
EA-9
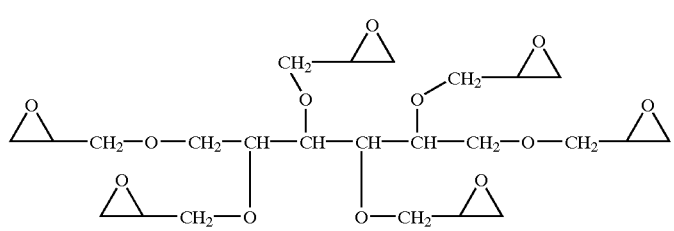
EA-10
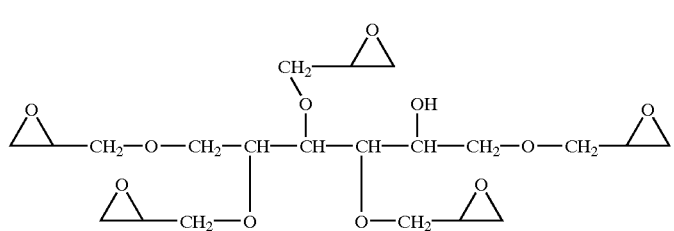
EA-11
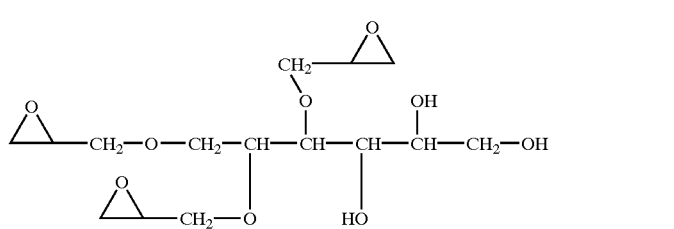
EA-12
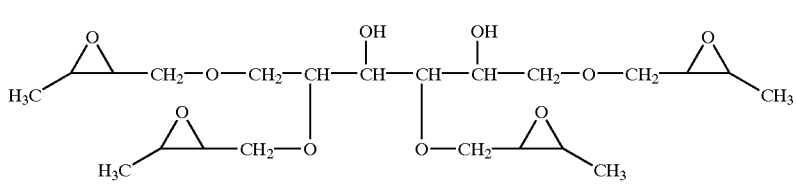
EA-13
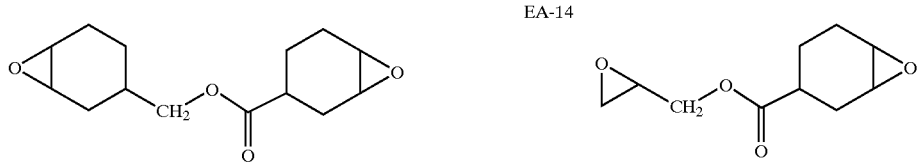
EA-14        EA-15
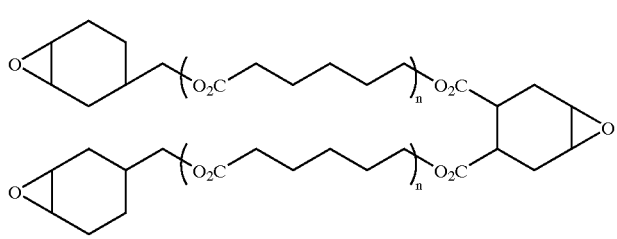
EA-16
$n = 1 \sim 4$ -continued

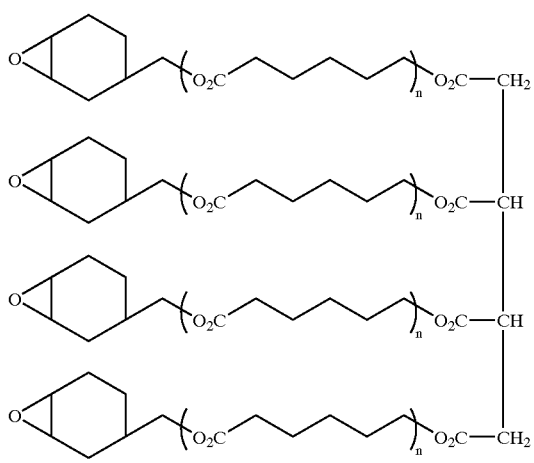
EA-17

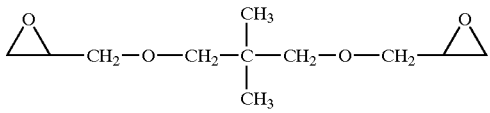
EA-18 n = 1 ~ 4

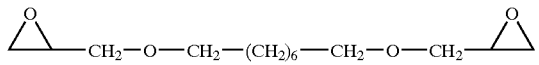
EA-19

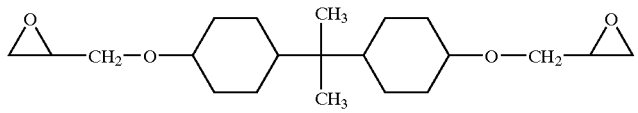
EA-20

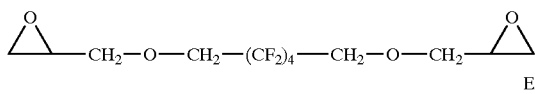
EA-21

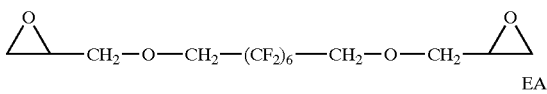
EA-22

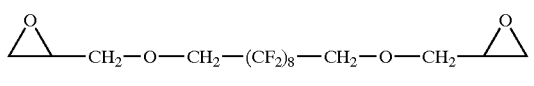
EA-23

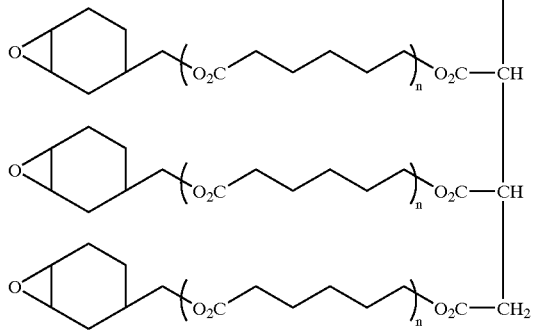
EA-24

EA-25

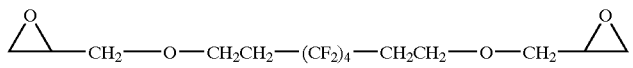
EA-26

The above-described hardener is preferably added in an amount of 5 to 50 mass %, more preferably 10 to 30 mass %, based on the fluorine-containing copolymer.

In the anti-reflection film of the present invention, fine particles can be added to a low-refractive-index layer, together with the above-described fluorine-containing copolymer and epoxy group-containing hardener. It is preferable that a refractive index of these fine particles to be added differs by 0.15 or less (more preferably 0.1 or less) from that of the matrix that is composed of the fluorine-containing copolymer and the hardener, to which matrix the fine particles are added. A particle diameter of the fine particles that can be used is generally in the range of 5 to 50 nm, preferably 5 to 30 nm, and particularly preferably 8 to 20 nm.

Owing to the addition of these fine particles, scratch resistance can be highly improved.

As to the material of the fine particles, any organic or inorganic materials may be used, if they satisfy the above-mentioned conditions. Inorganic fine particles having a high solidity are preferably added for enhancement of scratch resistance. Among these inorganic fine particles, substances selected from the group consisting of $MgF_2$, $Na_3AlF_6$, metal oxides and silica are preferable. Metal oxide or silica fine particles are more preferable, and silica fine particles are most preferable.

Silica fine particles that satisfy the above-mentioned conditions can be prepared by subjecting tetraalkoxysilane as a row material to hydrolysis and polymerization condensation in the presence of a catalyst such as aqueous ammonia, according to operations described by, for example, I. M. Thomas, in *Appl. Opt.*, 25, 1481(1986). In addition, as commercially available products, SNOWTEX IPA-ST and MEK-ST (all trade names) each manufactured by Nissan Chemical Industries, Ltd.; and AEROSIL 300, AEROSIL 130 and AEROSIL 50 (all trade names) each manufactured by Nippon Aerosil Co., Ltd., can be used.

Addition amount of fine particles is preferably in the range of 5 to 50 mass %, and particularly preferably in the range of 10 to 30 mass %, based on the total solid content of the coated and hardened film.

In the present invention, a hardening catalyst can be added to a hardening solution in order to harden the above-mentioned low-refractive-index layer composition. Examples of the hardening catalyst include proton acids such as toluene sulfonic acid and methane sulfonic acid; quarternary ammonium salts such as triethylbenzyl ammonium chloride and tetramethyl ammonium chloride; tertiary amines such as benzyl dimethylamine, tributylamine and tris(dimethylamino)methylphenol; imidazole compounds such as 2-methyl-4-ethyl imidazole and 2-methylimidazole; compounds that decompose upon heating to generate a proton acid, such as cyclohexyl ester of toluenesulfonic acid and isopropyl ester of toluenesulfonic acid; and various compounds that generate an acid catalyst on the action of radiation, as described below. In the present invention, the above-described compounds that generate an acid on the action of radiation are particularly preferable from the viewpoint of the pot life of a film-forming composition.

As to the compounds that generate an acid on the action of radiation, various kind examples are described in, for example, "Imeijinguyo Yuki Zairyo", edited by Yuki Erekutoronikusu Zairyo Kenkyukai (Bunshin Shuppan) pp. 187 to 198, and JP-A-10-282644. These known compounds may be used in the present invention. Specific examples include various kinds of onium salts such as diazonium salts, ammonium salts, phosphonium salts, iodonium salts, sulfonium salts, selenium salts and arsonium salts, each of which has a counter ion such as $RSO_3^-$ (in which R represents an alkyl group or an aryl group), $AsF_6^-$, $SbF_6^-$, $PF_6^-$ and $BF_4^-$; organic halides such as oxadiazole derivatives and S-triazole derivatives, each of which is substituted with a trihalomethyl group; o-nitrobenzyl esters, benzoin esters and iminoesters of organic acids; and disulfone compounds. Among these compounds, onium salts are preferable and sulfonium salts and iodonium salts are particularly preferable.

In combination with these compounds that generate an acid on the action of radiation, a sensitizing dye may be preferably used.

The addition amount of the above-described hardening catalyst may be varied in accordance with the kind of catalysis to be used. Generally, it is preferably in the range of about 0.1 to 15 mass %, and particularly preferably in the range of about 0.5 to 10 mass %, based on the total solid content of the film-forming composition.

The film-forming composition that forms a low-refractive-index layer according to the present invention may be prepared, for example, by dissolving or dispersing the above-described fluorine-containing polymer, hardener, fine particles (such as silica fine particles), and hardening catalysis, in a solvent. At this time, the concentration of the solid content may be optionally determined in accordance with a coating process. The concentration is generally from about 0.01 to about 60 mass %, preferably from about 0.5 to about 50 mass %, and particularly preferably from about 1 to about 20 mass %.

The kind of the above-described solvent is not particularly limited so long as each component of the composition can be homogeneously dissolved or dispersed in the solvent without causing precipitation of the components. Two or more kinds of solvents may be used in combination. Preferable examples of the solvent include ketones (e.g., acetone, methyl ethyl ketone, methyl isobutyl ketone), esters (e.g., ethyl acetate, butyl acetate), ethers (e.g., tetrahydrofuran, 1,4-dioxane), alcohols (e.g., methanol, ethanol, isopropyl alcohol, butanol, ethyleneglycol), aromatic hydrocarbons (e.g., toluene, xylene), and water.

In addition, various kinds of additives such as silane coupling agents, surfactants, thickeners and leveling agents may be optionally added to the film-forming composition according to the present invention, if necessary.

The hardening (curing) of the film is performed by drying at ordinary temperature, or heating at a temperature of about 30 to about 200° C. for a time period of about 1 minute to about 100 hours. In case where the film-forming composition of the present invention contains a compound that releases a hardening accelerator on the action of light, the layer may be hardened by irradiation of light corresponding to the absorption wavelength of the hardening accelerator or a sensitizing dye, using a high-pressure mercury lamp and the like. After irradiation of light in this case, the layer may be heated at a temperature of about 30 to about 200° C. for a time period of about 1 minute to about 10 hours.

The film-forming composition of the present invention may be coated on various substrates such as glass, plastic, metal, ceramics, wood and paper. The composition is not limited to the particular use, but can be applied to various uses. For example, use can be made of physical properties peculiar to the fluorinated polymer, such as weather resistance, waterproof, chemical resistance, stain proof, low friction and non-tackiness (for example, uses as building materials, coatings on the glass for automobiles, and the like and coatings for a cooking apparatus). Besides, use can be made of low dielectric constant characteristics peculiar to the fluorinated polymer (for example, the use of organic insulating film as described in *Denshi Zairyo* (1998, March), page 22). In particular, the composition of the present invention can be preferably used as an anti-reflection film that makes the best use of low refractive index characteristics The anti-reflection film of the present invention may be a single-layer construction consisting of only one low-refractive-index layer, or alternatively a multi-layer construction in which a low-refractive-index layer is superimposed together with a middle-refractive-index layer, a high-refractive-index layer, a hard coat layer, and the like. Such anti-reflection film may be positioned on the image display device in the form of the previously formed anti-reflection film or may be directly formed (in-situ) on the image display device and the like.

The anti-reflection film of the present invention is prepared by applying the above-described film-forming composition, as a low-refractive-index layer film-forming material, on a support, and then hardening.

Examples of the coating process include a dip coat process, an air knife coat process, a curtain coat process, a roller coat process, a wire bar coat process, a gravure coat process, and an extrusion coat process, as described in U.S. Pat. No. 2,681,294. At this time, the low-refractive-index layer may be simultaneously coated with other layers (a high-refractive-index layer, a middle-refractive-index layer, etc.) on a support. The simultaneous coating process is described in U.S. Pat. Nos. 2,761,791, 2,941,898, 3,508,947 and 3,526,528 and "Kotyngu Kogaku" by Yuji Harasaka, Asakura shoten (1973) p. 253.

The anti-reflection film of the present invention is explained in more detail below.

Layer Structure of an Anti-reflection Film

The anti-reflection film of the present invention is preferably composed of at least two layers, in which a low-refractive-index layer (1) formed by coating a composition according to the above-described process is superimposed on a high-refractive-index layer (2) having a higher refractive index than that of the layer (1). The refractive index of the low-refractive-index layer is preferably 1.45 or less, more preferably 1.44 or less, particularly preferably 1.40 or less. The refractive index of the high-refractive-index layer is preferably 1.57 or more, particularly preferably 1.65 or more. Further, these layers are preferably provided on a support, preferably a transparent support.

The anti-reflection film of the present invention is particularly preferably composed of four layers, in which a low-refractive-index layer (1) formed by coating a composition according to the above-described process is superimposed on a high-refractive-index layer (2) having a higher refractive index than that of the layer (1), and a middle-refractive-index layer (3) having a middle refractive index between the layer (1) and the layer (2). is formed adjacent to the layer (2) on the side opposite to the layer (1), and further a layer (4) (e.g., an undercoating layer) is sandwiched between said middle-refractive-index layer (3) and a support (preferably a transparent support). In this case, the refractive index of the high-refractive-index layer (2) adjacent to the low-refractive-index layer (1) is preferably 1.7 or more, particularly preferably 1.75 or more.

The film thickness of each layer is preferably 50 to 200 nm (layer (1)), 50 to 200 nm (layer (2)), 50 to 200 nm (layer (3)), and 1 $\mu$m to 100 $\mu$m (layer (4)); more preferably 60 to 150 nm (layer (1)), 50 to 150 nm (layer (2)), 60 to 150 nm (layer (3)), and 5 $\mu$m to 20 $\mu$m (layer (4)); and particularly preferably 60 to 120 nm (layer (1)), 50 to 100 nm (layer (2)), 60 to 120 nm (layer (3)), and 5 $\mu$m to 10 $\mu$m (layer (4)). The refractive index of the layer (4) is preferably 1.60 or less. The refractive index of the layer (3) is preferably a middle value between that of the layer (2) and that of the layer (4).

One typical example of the anti-reflection film of the present invention is shown in FIG. 1.

A high-refractive-index layer 12 is formed on a transparent film (support) 13, and further a low-refractive-index layer 11 is formed on the high-refractive-index layer 12. Increase in number of the layers that constitutes the anti-reflection film enlarges the range of a wavelength of light to which the anti-reflection film can be ordinarily applied. This effect is based on the principles of formation of previous multi-layer films using a metal compound.

In the anti-reflection film having the above-mentioned two layers, the high-refractive-index layer 12 and the low-refractive-index layer 11 generally satisfy the following conditions (1) and (2):

$$m\lambda/4 \times 0.7 < n1d1 < m\lambda/4 \times 1.3 \tag{1}$$

$$n\lambda/4 \times 0.7 < n1d2 < n\lambda/4 \times 1.3 \tag{2}$$

In the above formulas, m represents a positive integer (generally 1, 2 or 3), n1 represents a refractive index of the high-refractive-index layer. d1 represents a layer thickness (nm) of the high-refractive-index layer. n represents a positive odd integer (generally 1). n2 represents a refractive index of the low-refractive-index layer. d2 represents a layer thickness (nm) of the low-refractive-index layer. λ represents a wavelength of light. A refractive index n1 of the high-refractive-index layer is generally higher at least by 0.05 than that of the transparent film. A refractive index n2 of the low-refractive-index layer is generally lower at least by 0.1 than that of the high-refractive-index layer and lower at least by 0.05 than that of the transparent film. Further, the refractive index n1 of the high-refractive-index layer is generally in the range of 1.57 to 2.5. The above-mentioned conditions (1) and (2) are well known from the past. For example, they are described in JP-A-59-50401.

The terms "low refractive index", "middle refractive index (described hereinafter)", and "high refractive index" used in the present invention mean the relation of relative magnitude of refractive indices among constitutional layers of the anti-reflection film.

Figure 2:
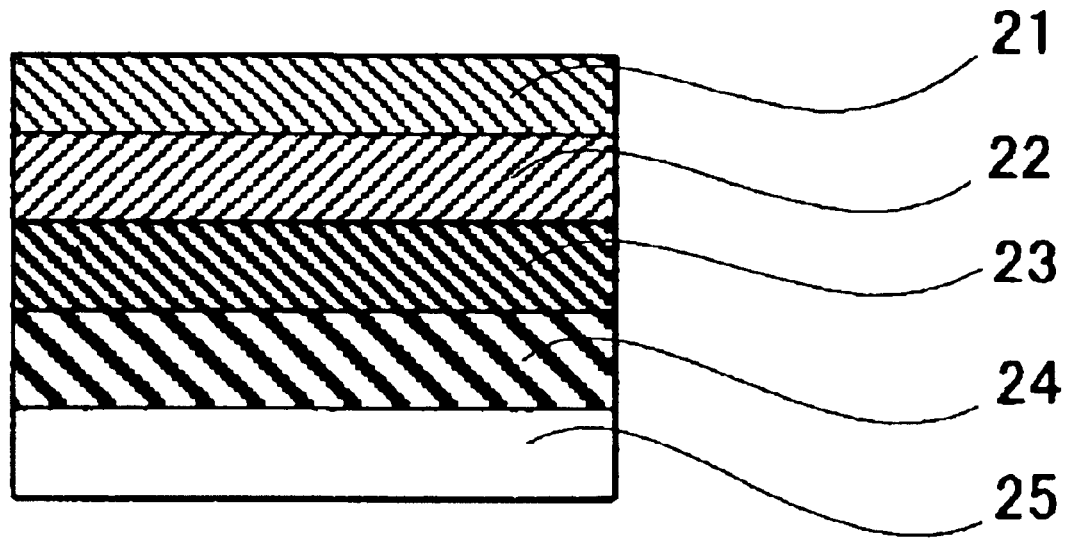
FIG. 2 is a sectional view schematically illustrating another example of the anti-reflection film of the present invention.

Another typical example of the anti-reflection film of the present invention is shown in FIG. 2.

An undercoating layer 24 and a middle-refractive-index layer 23 are formed on a transparent film (support) 25. A high-refractive-index layer 22 is formed on the middle-refractive-index layer 23 and further a low-refractive-index layer 21 is formed on the high-refractive-index layer 22. A refractive index of the middle-refractive-index layer 23 is a middle value between the high-refractive-index layer 22 and the undercoating layer 24. The anti-reflection film shown in FIG. 2 further enlarges a wavelength region of light that can be applied, as compared to the anti-reflection film shown in FIG. 1.

In case of the anti-reflection film having three layers, a middle-refractive-index layer, a high-refractive-index layer and a low-refractive-index layer each generally satisfy the following conditions (3) to (5):

$$h\lambda/4 \times 0.7 < n3d3 < h\lambda/4 \times 1.3 \tag{3}$$

$$k\lambda/4 \times 0.7 < n4d4 < k\lambda/4 \times 1.3 \tag{4}$$

$$j\lambda/4 \times 0.7 < n5d5 < j\lambda/4 \times 1.3 \tag{5}$$

In the above formulas, h represents a positive integer (generally 1, 2 or 3), n3 represents a refractive index of the middle-refractive-index layer. d3 represents a layer thickness (nm) of the middle-refractive-index layer. k represents a positive integer (generally 1, 2 or 3). n4 represents a refractive index of the high-refractive-index layer. d4 represents a layer thickness (nm) of the high-refractive-index layer. j represents a positive odd number (generally 1). n5 represents a refractive index of the low-refractive-index layer. d5 represents a layer thickness (nm) of the low-refractive-index layer. λ represents a wavelength of light. A refractive index n3 of the middle-refractive-index layer is generally in the range of 1.5 to 1.7. The refractive index n4 of the high-refractive-index layer is generally in the range of 1.7 to 2.2.

Further, λ in formulae (1) to (5) stands for a wavelength of light (for example, visible radiation). When the anti-reflection film is used as an anti-reflection layer for a visible wavelength range, λ is within the range of 380 to 680 nm. The anti-reflection film is effective to not only visible radiation, but also ultraviolet radiation and infrared radiation, each of which is near the visible region. The terms "low refractive index", "middle refractive index", and "high refractive index" described herein mean a relative magnitude of the refractive indices among layers. For example, a middle-refractive-index layer is prepared changing the content of high-refractive-index inorganic fine particles that are added to the high-refractive-index layer.

In the anti-reflection film of the present invention having the above-described layer construction, the improved low-refractive-index layer containing at least a specific fluorine-containing copolymer according to the present invention is used.

Low-Refractive-Index Layer

The low-refractive-index layer is superimposed on the high-refractive-index layer, as shown in FIGS. 1 and 2. The surface of an anti-reflection film locates at the upper side of the low-refractive-index layer.

Both refractive index and thickness of the low-refractive-index layer are described above. A haze of the low-refractive-index layer is preferably 3% or less, more preferably 2% or less, and most preferably 1% or less. A practical mechanical strength of the low-refractive-index layer is preferably H or harder, more preferably 2H or harder, and most preferably 3H or harder, in terms of pencil grade according to the pencil hardness test under the load of 1 kg.

High- and Middle-Refractive-Index Layers

In case where the anti-reflection film of the present invention has a form of a multi-layer film, the low-refractive-index layer is generally used together with at least one layer having a higher refractive index than the low-refractive-index layer (i.e., the above-mentioned high-refractive-index layer and/or middle-refractive-index layer).

Examples of the organic material that is used to form the above-mentioned layer having a higher refractive index than the low-refractive-index layer include thermoplastic film (e.g., polystylenes, polystylene copolymers, polycarbonates, polymers having an aromatic ring, heterocyclic ring or alicyclic group excluding polystyrenes; and polymers having a halogen atom excluding a fluorine atom); compositions for forming a thermal low-refractive-index layer (e.g., film-forming compositions in which melamines, phenols or epoxies are used as a hardener); urethane-forming compositions (e.g., a combination of alicyclic or aromatic isocyanate and polyol), and radical polymerizable compositions (compositions containing a modified film or pre-polymer in which a double bond is introduced into the above-mentioned compounds (polymers and the like) so that a radical curing can be performed. Materials having a high film-forming property are preferable. In a layer having a higher refractive index than the above-mentioned layer, inorganic fine particles dispersed in an organic material may be also used. Because inorganic fine particles generally have a high refractive index, even an organic material having a relatively lower refractive index, when compared to the case where an organic material is used alone, also can be used in the above-said layer. Examples of these materials include, in addition to the above-mentioned organic materials, various kinds of transparent organic materials that are able to form a stable dispersion of inorganic fine particles, such as vinyl-series copolymers including acryl-series copolymers, polyesters, alkyd films, fibrous polymers, urethane films, various kinds of hardeners that are able to harden these materials, and compositions having a hardening functional group.

Further, silicon-series compounds substituted with an organic substituent may be included in the above-mentioned organic materials. Examples of these silicon-series compounds are those represented by the following formula, or hydrolytic products thereof:

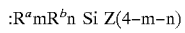

:R$^a$mR$^b$n Si Z(4−m−n)

In which R$^a$ and R$^b$ each represent an alkyl group, an alkenyl group, an aryl group, or a hydrocarbon group substituted with halogen, epoxy, amino, mercapto, methacryloyl or cyano; Z represents a hydrolysable group selected from the group consisting of an alkoxy group, an alkoxyalkoxy group, a halogen atom and an acyloxy group; m and n each represent 0, 1 or 2, providing that m+n=1 or 2.

Preferable examples of the inorganic compound of the inorganic fine particles dispersed in the above-mentioned organic material include oxides of metallic element such as aluminum, titanium, zirconium and antimony. These compounds are sold at a market in the form of fine particles, namely powder, or a colloidal dispersion of the fine particles in water and/or other solvent. These fine particles are further mixed and dispersed in the above-mentioned organic material or organic silicon compound for use.

As the material that forms a layer having a higher refractive index than the above-mentioned materials, film-forming inorganic materials that can be dispersed in a solvent, or that are themselves liquid form (e.g., alkoxides of various elements, organic acid salts, coordination compounds bonding with a coordinating compound (e.g., chelate compounds), and inorganic polymers) are enumerated. Preferable examples of these compounds include metal alkolate compounds such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-prpoxide, zirconium tetra-n-prpoxide, zirconium tetra-n-butoxide, zirconium tetra-sec-butoxide and zirconium tetra-tert-butoxide; chelate compounds such as diisopropoxy titanium bis(acetylacetonate), dibutoxy titanium bis (acetylacetonate), diethoxy titanium bis(acetylacetonate), bis(acetylacetone zirconium), aluminum acetylacetonate, aluminum di-n-butoxide monoethylacetoacetate, aluminum di-i-propoxide monomethylacetoacetate and tri-n-butoxide zirconium monoethylacetoacetate; and inorganic polymers comprising carbon zirconyl ammonium or zirconium as a main component. In addition to the above-mentioned compounds, various kinds of alkyl silicates or hydrolytic product thereof, and silica in the form of fine particles (particularly a colloidal dispersion of silica gel) also may be used as an additional material that can be used in combination with the above-mentioned compounds, even though such material has relatively a low refractive index.

Both refractive index and thickness of the higher refractive index layer are described above. A haze of the high-refractive-index layer is preferably 5% or less, more preferably 3% or less, and most preferably 1% or less. A practical mechanical strength of the high-refractive-index layer is preferably H or harder, more preferably 2H or harder, and most preferably 3H or harder, in terms of pencil grade according to the pencil hardness test under the load of 1 kg.

The refractive index of the middle-refractive-index layer is adjusted so as to become a value (magnitude) between the refractive index of the low-refractive-index layer and the refractive index of the high-refractive-index layer. The refractive index of the middle-refractive-index layer is preferably in the range of 1.50 to 1.70.

It is particularly preferable that inorganic fine particles and a polymer are used in the high-refractive-index layer, and that the middle-refractive-index layer is formed adjusting so that the refractive index of the middle-refractive-index layer becomes lower than that of the high-refractive-index layer. A haze of the middle-refractive-index layer is preferably 3% or less.

Other Layers

The anti-reflection film may be further provided with a hard coat layer, a moisture-proof layer, an anti-static layer, an undercoating layer and a protective layer. The hard coat layer is provided to give a scratch resistance to a transparent support. The hard coat layer also has a function to strengthen adhesion between the transparent support and a layer provided thereon. The hard coat layer may be formed using acrylic polymers, urethane-series polymers, epoxy-series polymers, silicon-series polymers, and/or silica-series compounds. A pigment may be added to the hard coat layer. The acrylic polymers are preferably synthesized by a polymerization reaction of multi-functional acrylate monomers (for example, polyol acrylate, polyester acrylate, urethane acrylate, epoxy acrylate). Examples of the urethane-series polymers include meramine polyurethane. As the silicon-series polymers, co-hydrolysis products of a silane compound (e.g., tetraalkoxysilane, alkyltrialkoxysilane) and a silane-coupling agent having a reactive group (e.g., epoxy, methacryl) are preferably used. Two or more kinds of polymers may be used in combination. As the silica-series compounds, colloidal silica is preferably used. The mechanical strength of the hard coat layer is preferably H or harder, more preferably 2H or harder, and most preferably 3H or harder, in terms of pencil grades per 1 kg of load. On the transparent support, an adhesion layer, a shield layer, a slide layer and an anti-static layer may be superimposed, in addition to the hard coat layer. The shield layer is provided to shield electromagnetic waves and/or infrared radiation.

Transparent Support

The anti-reflection film preferably has a transparent support, but for the case where the anti-reflection film is directly placed on the surface of a CRT image display or lens.

The anti-reflection film of the present invention generally comprises a support and a low-refractive-index layer provided thereon. The support is generally a transparent film.

As the transparent support, a plastic film is more preferable than a glass plate. Examples of the material of the plastic film include cellulose esters (e.g., triacetyl cellulose (TAC), diacetyl cellulose, propionyl cellulose, butyryl cellulose, acetylpropionyl cellulose, nitrocellulose), polyamides, polycarbonates (e.g., those compounds described in U.S. Pat. No. 3,023,101), polyesters (e.g., polyethylene terephthalate, polyethylenenaphthalate, poly-1,4-cyclohexanedimethylene terephthalate, polyethylene-1, 2-diphenoxyethane-4,4,'-dicarboxylate, polybutyleneterephthalate, and polyesters described in JP-B-48-40414 ("JP-B" means examined Japanese patent publication)), polystylenes (e.g., syndiotactic polystylene), polyolefins (e.g., polypropylene, polyethylene, polymethylpentene), polysulfones, polyethersulfones, polyarylates, polyetherimides, polyoxyethylenes, polymethyl methacrylates, and polyetherketones. Among these materials, triacetyl cellulose, polycarbonates, polyethyleneterephthalate and polyethylenenaphthalate are preferable. A refractive index of the transparent film is preferably in the range of 1.40 to 1.60. A light transmittance of the transparent support is preferably 80% or more, and more preferably 86% or more. The haze of the transparent support is preferably 2.0% or less, and more preferably 1.0% or less. The transparent support preferably has a refractive index of 1.4 to 1.7. Infrared absorbers or ultraviolet absorbers may be added to the transparent support. The addition amount of the infrared absorbers is preferably in the range of 0.01 to 20 mass %, more preferably in the range of 0.05 to 10 mass %, to the transparent support. Particles of an inactive inorganic compound that act as a slide agent may be added to the transparent support. Examples of the inactive inorganic compound include $SiO_2$, $TiO_2$, $BaSO_4$, $CaCO_3$, talc and kaolin. The transparent support may be subjected to a surface treatment.

Examples of the surface treatment include a chemical treatment, a mechanical treatment, a corona discharge treatment, a flame treatment, an ultraviolet irradiation treatment, a high-frequency treatment, a glow discharge treatment, an activated plasma treatment, a laser treatment, a mixed acid treatment, and an ozone oxidation treatment. Among these treatments, preferred are a glow discharge treatment, an ultraviolet irradiation treatment, a corona discharge treatment and a flame treatment, and more preferably a glow discharge treatment and an ultraviolet irradiation treatment.

Formation of an Anti-Reflection Film

In the case where the anti-reflection film is composed of a single layer, or multi layers as described above, each layer may be formed by coating, in accordance with a dip coat process, an air-knife coat process, a curtain coat process, a roller coat process, a wire bar coat process, a gravure coat process, or an extrusion coat process (described in U.S. Pat. No. 2,681,294). Two or more layers may be coated at the same time. Such simultaneous coating method is described in U.S. Pat. Nos. 2,761,791, 2,941,898, 3,508,947, 3,526,528, and "Kotingu Kogaku" by Yuji Harazaki, Asakura Shoten (1973), page 253.

It is preferable that the reflectance of the anti-reflection film is as low as possible. Specifically, the average reflectance in the wavelength region of 450 to 650 nm is preferably 2% or less, more preferably 1% or less, and most preferably 0.7% or less. The haze of the anti-reflection film that does not have an anti-glare function that will be described later, is preferably 3% or less, more preferably 1% or less, and most preferably 0.5% or less. The mechanical strength of the anti-reflection film is preferably H or harder, more preferably 2H or harder, and most preferably 3H or harder, in terms of pencil grades per 1 kg of load.

The anti-reflection film of the present invention may be provided, to its surface, with an anti-glare function, which scatters incident light on the surface of the film and prevents to mirror a background view (surrounding the film) on the surface of the film. For example, the anti-reflection film exhibiting such anti-glare function can be obtained by forming microscopic unevenness (roughness) on the surface of a transparent film, and then superimposing an anti-reflection film (e.g., a low-refractive-index layer) on the above-said surface. Further, the above-described fine unevenness may be formed according to any one of known methods. For example, a small amount (for example, 0.1 to 50 mass %) of inorganic or organic fine particles (for example, particle diameter: 50 nm to 2 μm) may be added to a low-refractive-index layer, a high-refractive-index layer, a middle-refractive-index layer, or other layers (for example, a hard coat layer). Alternatively, the fine unevenness may be provided on the uppermost layer of the anti-reflection film, by introducing fine particles having a particle diameter of 50 nm to 2 μm into a coating liquid for forming a low-refractive-index layer in an amount of 0.1 to 50 mass %. Alternatively, the fine unevenness may be provided by emboss processing after forming the low-refractive-index layer, as described in JP-A-2000-329905 and JP-A-2000-275404.

In the anti-reflection film that comprises two layers of a low-refractive-index layer and a high-refractive-index layer, particles made of an organic or inorganic compound are preferably added to the high-refractive-index layer. For example, silica particles, $TiO_2$ particles, cross-linking acrylic particles, cross-linking stylene particles, melanine film particles, and benzoguanamine film particles are preferably used. The average particle diameter of these particles is preferably 1.0 to 10.0 μm, more preferably 1.5 to 7.0 μm. The shape of these particles to be used may be spherical or irregular. Two or more different kinds of particles may be used in combination. A coating amount of the particles is preferably in the range of 10 to 1000 mg/m$^2$, more preferably in the range of 30 to 100 mg/m$^2$. Further, it is preferable that silica particles having a larger particle diameter than ½ of the film thickness of the high-refractive-index layer occupy 40 to 100% of the total of said silica particles. The particle size distribution can be measured by a Coulter counter method or a centrifugal precipitation method, or the like. However, the distribution is considered in terms of the number of particles. The film thickness of the high-refractive-index layer is preferably 1 to 10 μm, more preferably 1.2 to 6 μm.

In the case of providing the anti-reflection film with an anti-glare function as mentioned above, namely subjecting the anti-reflection film to an anti-glare treatment, the haze of the anti-reflection film is preferably 3 to 30%, more preferably 5 to 20%, and most preferably 7 to 20%

The anti-reflection film of the present invention that preferably has an anti-glare function, or the anti-reflection membrane of the present invention, can be applied to an image display devices such as a liquid crystal display (LCD), a plasma display panel (PDP), an electroluminescence display (ELD) and a cathode ray tube display (CRT). The anti-reflection membrane is disposed so that a high-refractive-index layer is placed at the side of the screen of an image display device. In the case where the anti-reflection membrane has a transparent support, the anti-reflection film is provided on the image display device so that the side of the transparent support is adhered to the screen of the image display device. In these image display devices equipped with such an anti-reflection film, reflection of incident light to the display surface is prevented, so that observation of the image is remarkably improved. A model of the liquid crystal display device (LCD) equipped with the anti-reflection film of the present invention is composed, for example, of:

a liquid crystal cell comprising a pair of substrates having a transparent electrode and a nematic liquid crystal sealed between these substrates, polarizing plates arranged on both sides of said liquid crystal cell, and an anti-reflection film of the present invention provided on the surface of at least one of said polarizing plates. The anti-reflection film can be also applied to a case cover, an optical lens, a lens for glasses, a window shield, a light cover, and a helmet shield.

Generally, the anti-reflection film reduces reflectance to 2% or less. It is preferable in the present invention that reflectance is reduced to 1% or less.

The fluorine-containing copolymer of the present invention is high in both fluorine content and density of the cross-linkable group. The membrane-forming composition of the present invention that contains said fluorine-containing copolymer is excellent in scratch resistance of the hardened membrane. The anti-reflection membrane of the present invention, that is obtained by a method of coating and hardening said membrane-forming composition containing the fluorine-containing copolymer on a high-refractive-index layer to form a low-refractive-index layer, is inexpensive and has satisfactory anti-reflection capacity and scratch resistance.

The film-forming composition containing the polymer of the present invention is low in refractive index, and can form a film that is excellent in mechanical strength. Further, the anti-reflection film produced using said film-forming composition that is employed as a material for the low-refractive-index layer, is high in anti-reflection capacity and also excellent in scratch resistance.

The anti-reflection film of the present invention exhibits excellent properties of anti-reflection and scratch resistance. Further, the anti-reflection film can be produced relatively economically. A polarizing plate and a display device (e.g., a liquid crystal display device) using the anti-reflection film are sufficiently prevented from mirroring a background view on the display surface thereof, and moreover exhibit an excellent property of high scratch resistance. The fluorine-containing copolymer of the present invention can be preferably used as a component of the above-described anti-reflection film.

The present invention will be described in more detail based on examples given below, but the present invention is not limited to these examples. Note that the "%" in the following Examples and Synthetic examples mean mass %, unless otherwise specified. The refractive index of a polymer described in the following Synthetic examples means values that were obtained by measurement at 20° C. using the Abb'es' refractometer (manufactured by ATAGO CO., LTD.).

EXAMPLE

Synthetic Examples

Synthetic Example 1

Synthesis of P-19

1) Synthesis of M1-(5)

To a mixture of 1H, 1H-perfluorooctanol (84 g) and tetra-n-butyl ammonium hydrogen sulfate (17 g), an aqueous solution of sodium hydroxide (33.8 g) dissolved in water (50 ml) was added and stirred at room temperature for 30 minutes. Further, chloroethyl vinyl ether (89.8 g) and toluene (90 ml) were added thereto and heated with stirring at 80° C. for 5 hours.

Then, ethyl acetate was added to the resulting reaction solution, followed by washing with water. The organic layer was extracted and dried with magnesium sulfate, and condensed at reduced pressure to distill off the solvents. The resulting liquid was purified by vacuum distillation, to obtain the target product M1-(5) (boiling point 79.5 to 80° C., 800 Pa).

2) Synthesis of P-19

In an autoclave, whose inner volume was 1 liter, equipped with a glass-made stirrer (manufactured by TAIATSU GARASU K. K.), ethyl acetate (180 ml), M1-(5) (31.9 g), γ-trimethoxysilylpropylvinyl ether (21.0 g) (a monomer constituent corresponding to the constituent A-1, and synthesized according to the method described in JP-A-48-62726), and dilauroyl peroxide (1.29 g) were placed. Then, the interior of the autoclave was subjected to de-airing and filled with a nitrogen gas. Further, hexafluoropropylene (HFP) (25.4 g) was introduced into the autoclave and heated up to 65° C. The pressure at the time when the inner temperature of the autoclave was elevated to 65° C. was 2.05 kg/cm$^2$. After continuation of stirring for 20 hours while keeping 65° C., heating was stopped at the time when the pressure was reduced to 0.95 kg/cm$^2$, so that the inner temperature was allowed to fall. Then, at the time when the inner temperature fell to room temperature, remaining unreacted monomers were expelled, and then the autoclave was opened to take out the reaction solution from there. After condensation, the resultant polymer was dissolved in a small amount of ethyl acetate and re-precipitated with n-hexane. The thus-obtained polymer was re-precipitated twice with n-hexane so that the remaining monomers were completely removed. Said polymer was dried under reduced pressure, to obtain P-19. The yield of the polymer was 45 g.

A composition analysis of the thus-obtained polymer was performed by means of elementary analysis and NMR. As a result, the following polymer composition was identified. M1-(5)/HFP/A-1=20/50/30 (molar ratio). The content of the cross-linking reactive group (an alkoxysilyl group) in the polymer was 1.3 mmol/g. Refractive index of the polymer was 1.38.

<Results of Elementary Analysis>

|  | C | H | Si | F |
|---|---|---|---|---|
| Observed: | 32.65% | 3.22% | 3.56% | 49.58% |
| Calculated: | 32.77% | 3.14% | 3.65% | 49.36% |

Synthetic Example 2

Synthesis of P-6 (EP-2)

1) Synthesis of 2-(1H,1H,5H-perfluoropentyloxy) ethylvinylether (M1-(1))

To a mixture of 1H,1H-perfluoropentanol (100 g) and tetra-n-butyl ammonium hydrogen sulfate (20 g), an aqueous solution of sodium hydroxide (69 g) dissolved in water (100 ml) was added and stirred at room temperature for 30 minutes. Further, chloroethyl vinyl ether (183.8 g) and toluene (150 ml) were added thereto and heated with stirring at 80° C. for 5 hours.

Then, ethyl acetate was added to the resulting reaction solution, followed by washing with water. The organic layer was extracted and dried with magnesium sulfate, and condensed at reduced pressure to distill off the solvents. The resulting liquid was purified by vacuum distillation, to obtain 100 g of the target fluorine-containing vinyl ether compound (boiling point 73 to 76° C., 1064 Pa).

2) Synthesis of 2-glycidyloxyethyl vinyl ether (A-37)

To a mixture of hydoxyethyl vinyl ether (500 g) and tetra-n-butyl ammonium hydrogen sulfate (50 g), an aqueous solution of sodium hydroxide (340 g) dissolved in water ax (380 ml) was added over 30 minutes and then further stirred at room temperature for 1 hour. Further, chloromethyloxysilane (78.8 g) was added thereto and stirred at 60° C. for 2 hour. Then, ethyl acetate was added to the reaction mixture, followed by washing with water. The organic layer was extracted and dried with magnesium sulfate, and condensed at reduced pressure to distill off the solvents. The resulting liquid was purified by vacuum distillation, to obtain 530 g of the 2-glycidyloxyethyl vinyl ether (A-37) (boiling point 65° C., 532 Pa).

3) Synthesis of P-6 (EP-2)

In an autoclave, whose inner volume was 100 ml, equipped with a stainless steel-made stirrer (manufacturedy by TAIATSU GARASU K. K.), ethyl acetate (25 ml), M1-(1) (7.84 g), 2-glycidyloxyethyl vinyl ether (A-37) (5.61 g) and dilauroyl peroxide (0.34 g) were placed. The interior of autoclave was degassed and substituted with a nitrogen gas. Further, hexafluoro propylene (HFP) (9.74 g) was introduced into the autoclave and heated up to 65° C. The pressure at the time when the inner temperature of the autoclave was elevated to 65° C. was 5.4 kg/cm². After continuation of stirring for 8 hours while keeping 65° C., heating was stopped at the time when the pressure was reduced to 3.2 kg/cm², so that the inner temperature was allowed to fall. Then, at the time when the inner temperature fell to room temperature, remaining unreacted monomers were expelled and then the autoclave was opened to take out the reaction solution from there. After condensation, the resultant polymer was dissolved in a small amount of ethyl acetate and re-precipitated with n-hexane. The thus-obtained polymer was re-precipitated twice with n-hexane so that the remaining monomers were completely removed. Said polymer was dried under reduced pressure, to obtain P-6. The yield of the polymer was 8.7 g.

A composition analysis of the thus-obtained polymer was performed by means of elementary analysis and NMR. As a result, the following copolymer composition was identified. HFP/2-(1H,1H,5H-perfluoropentanyloxy)ethyl vinyl ether (M1-(1))/2-glycidyloxyethyl vinyl ether (A-37)=50/20/30 (molar ratio). A refractive index of the polymer was 1.396.

Synthesis Example 3

Synthesis of P-4

In an autoclave, whose inner volume was 100 ml, equipped with a stainless steel-made stirrer (manufactured by TAIATSU GARASU K. K.), ethyl acetate (25 ml), M1-(1) (10 g), 4-hydroxybutyl vinyl ether (A-34) (2.56 g) and dilauroyl peroxide (0.21 g) were placed. Then, the interior of the autoclave was subjected to de-airing and filled with a nitrogen gas. Further, hexafluoro propylene (HFP) (9.92 g) was introduced into the autoclave and heated up to 65° C. The pressure at the time when the inner temperature of the autoclave was elevated to 65° C. was 6.7 kg/cm². After continuation of stirring for 8 hours while keeping 65° C., heating was stopped at the time when the pressure was reduced to 4.5 kg/cm², so that the inner temperature was allowed to fall. Then, at the time when the inner temperature fell to room temperature, remaining unreacted monomers were expelled and then the autoclave was opened to take out the reaction solution from there. After condensation, the resulting polymer was dissolved in a small amount of ethyl acetate, and then re-precipitated with a much excessive amount of methanol. The thus-obtained polymer was re-precipitated twice with methanol so that the remaining monomers were completely removed. Said polymer was dried under reduced pressure, to obtain P-4. The yield of the polymer was 8.7 g.

A composition analysis of the thus-obtained polymer was performed by means of elementary analysis and NMR. As a result, the following copolymer composition was identified. HFP/2-(1H,1H,5H-perfluoropentanyloxy)ethyl vinyl ether (M1-(1))/4-hydroxybutyl vinyl ether (A-34)=50/30/20 (molar ratio). A refractive index of the polymer was 1.385.

Synthesis Example 4

Synthesis of P-16

The above-obtained P-4 (10 g) was dissolved in ethyl acetate (50 ml). Then, triethylamine (1.87 g) and Irganox 1010 (0.1 g) (polymerization inhibitor, manufactured by Ciba-Geigy) were added thereto, while cooling on ice. Further, a solution of acrylic acid chloride (1.68 g) diluted with in ethyl acetate (10 ml) was added dropwise with stirring, and the resulting reaction solution was further stirred at room temperature for 5 hours. Thereafter, said reaction solution was washed with water, and then the organic layer was extracted and dried with magnesium sulfate, and condensed at reduced pressure. Further, the thus-obtained polymer was dissolved in a small amount of ethyl acetate, and then re-precipitated with a much excessive amount of hexane. Such re-precipitation operation was repeated twice, and the thus-obtained polymer was dried at reduced pressure, to obtain P-16. The yield of the polymer was 6 g.

As a result of NMR analysis of the polymer, it was found that the hydroxyl group of P-4 was almost completely modified with an acryl group. Refractive index of the polymer was 1.389.

Other fluorine-containing copolymers of the present invention were also synthesized in the same manner as in the above-described Synthesis Example.

Synthesis of Comparative Compounds 1 to 4

Comparative compounds 1 to 4 were obtained in the same manner as in Synthetic Example 2, except for changing a constituent of the copolymer and a composition of the reaction mixture. The refractive indices of the obtained polymers were as follows:

Comparative compound 1:1.421, Comparative compound 2: 1.413, Comparative compound 3:1.425, Comparative compound 4:1.417

$$-(CF_2-CF)_a- \quad -(CH_2-CH)_b- \quad -(CH_2-CH)_c-$$

random copolymer (a, b and c each represent a mole fraction of each constituent)

| | a/b/c |
|---|---|
| Compound for comparison 1 | 50/10/40 |
| Compound for comparison 2 | 50/20/30 |

$$-(CF_2-CF)_a- \quad -(CF_2-CF)_b- \quad -(CH_2-CH)_c-$$

random copolymer (a, b and c each represent a mole fraction of each constituent)

| | a/b/c |
|---|---|
| Compound for comparison 3 | 40/10/50 |
| Compound for comparison 4 | 30/20/50 |

Synthesis of Comparative Compound 5 (the Compound Described in Example 5 of JP-A-8-92323)

Comparative compound 5 was synthesized by polymerization of hexafluoropropylene (HFP) (143 g), ethyl vinyl ether (EVE) (50 g) and hydroxybutyl vinyl ether (HBVE) (20 g) according to the above-described operation.

A composition analysis of the thus-obtained polymer was performed by means of elementary analysis and NMR. As a result, the following polymer composition was identified. HFP/EVE/HBVE=50/40/10 (molar ratio). The content of the cross-linking reactive group (a hydroxyl group) in the polymer was 0.866 mmol/g. Refractive index of the polymer was 1.385.

Compound for comparison 5

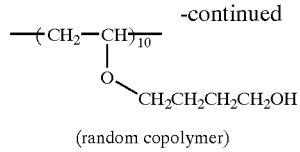

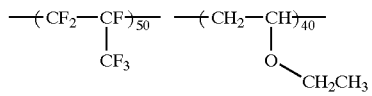

(random copolymer)

Synthesis of Comparative Compound 6 (the Compound described in Example 5 of JP-A-10-147749)

The above-described comparative compound 5 (10 g), γ-triethoxysilylpropyl isocyanate (1 g) and dibutyl tin dilaulate (1 mg) were admixed into methyl ethyl ketone (50 g), and stirred at 20° C. for 12 hours under $N_2$ atmosphere. Thus, a MEK solution of Comparative compound 6, in which a part of hydroxyl groups was replaced with alkoxy silyl groups, was obtained. Refractive index of the solid content was 1.394. Content of the cross-linking reactive groups (i.e., an alkoxysilyl group+a hydroxyl group) was 0.866 mmol/g.

Compound for comparison 6

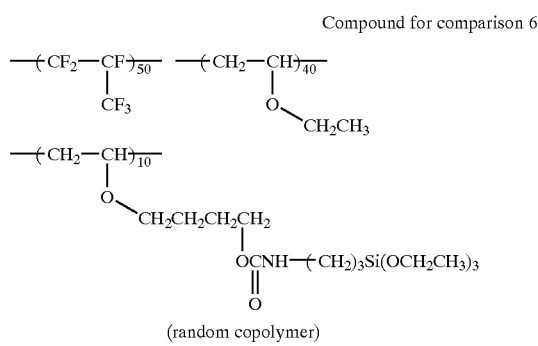

(random copolymer)

Synthesis of Comparative Compound 7

Comparative compound 7 was synthesized by a reaction between acrylic acid chloride and the polymer containing a hydroxyl group in the same manner as for the above-described Synthetic Example 4. Refractive index of the resultant polymer was 1.403.

Compound for comparison 7

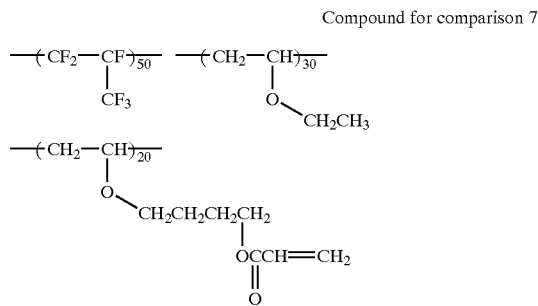

Example 1

Evaluation of Hardened Film

Copolymers of the present invention (P-5, P-30) and Comparative compounds 1 to 4 were respectively dissolved in methyl isobutyl ketone so that a concentration of the respective polymer became 30 mass %, followed by addition of a photo-induced acid-generating agent UV 16990 (trade name, manufactured by Union Carbide Japan Co., Ltd.) in an amount of 5 mass %, based on the copolymer, to prepare a film-forming composition liquid. Said film-forming composition was coated on a glass substrate, followed by drying, and irradiation with ultraviolet radiation having energy of 500 mj/cm². Then, the coated composition was heated at 120° C. for 10 minutes, to form a film having thickness of about 20 μm.

The hardness of said film was measured by means of a micro-hardness tester Fischer scope H 100 VP-HCU (trade name, manufactured by Fischer Instrument Co.). At this time, a quadrangular weight-loaded indenting tool (a head angle between the opposite faces: 136°) made of diamond was used. A forced depth under a suitable test load was measured within the range of the forced depth of not more than 1 μm. The value of universal hardness is represented by a value of a test load divided by the surface area that is calculated from the geometrical shape of pressure marks formed under the test load.

The values of universal hardness (HU) of each film and the reflactive indices of each cured film (measured by means of the Abb'e's refractometer (manufactured by ATAGO CO., LTD) at 20° C.) are shown in Table 3.

TABLE 3

| Fluorine-containing copolymer | Values of universal hardness (N/mm²) | Hardened film's Refractive Index |
|---|---|---|
| P-5 (This invention) | 98.9 | 1.420 |
| P-30 (This invention) | 99.5 | 1.410 |
| Compound for comparison 1 (Comparative example) | 92.4 | 1.432 |
| Compound for comparison 2 (Comparative example) | 23.2 | 1.422 |
| Compound for comparison 3 (Comparative example) | 72.7 | 1.436 |
| Compound for comparison 4 (Comparative example) | 27 | 1.433 |

It is understood that fluorine-containing copolymers of the present invention P-5 and P-30 were superior to each of the comparative compounds 1 to 4 from the viewpoint of compatibility between enhancement of hardness and lowering of refractive index. That is, it is understood that the copolymers of the present invention were not only excellent in hardness but also lower in refractive index, when compared to the Compound for comparison 1 produced by co-polymerization with ethyl vinyl ether. Likewise, the copolymers of the present invention were also excellent in film hardness, when compared to the Compound for comparison 2, even though their refractive indices were almost same. On the other hand, it is understood that Compounds for comparison 3 and 4 produced by copolymerization with perfluoro(propylvinyl ether) were considerably inferior to the copolymers of the present invention.

Example 2

Evaluation of an Anti-Reflection Film

Preparation of A Coating Solution for A Low-Refractive-Index Layer

Ingredients shown in the following Table 4 were mixed, and then dissolved in methyl ethyl ketone, to prepare a coating solutions for a low-refractive-index layer containing the solid content of 5%. Figures in parentheses in Table 4 represent the solid content of each ingredient in terms of mass part.

In Table 4, colloidal silica represents MEK-ST (trade name) manufactured by Nissan Chemical Industries, Ltd.

CYMEL 303 (trade name) represents methylol melamine manufactured by Mitsui Cytec Ltd.

TAKENATE D110 (trade name) represents an isocyanate-series hardener manufactured by Takeda Chemical Industries, Ltd.

DPHA represents dipentaerythritol hexaacrylate manufactured by Nippon Kayaku Co., Ltd.

OXT221 (trade name) represents a di-functional oxetane-series hardener manufactured by Toa Gosei Co., Ltd.

TEOS sol represents a sol solution prepared by addition of a 0.01 N hydrochloric acid (2.26 g) to tetraethoxy silane (10 g), followed by stirring for 5 hours.

SiNCO (trade name) represents γ-triethoxysilylpropyl isocyanate. Similarly to the Compound for comparison 6, this isocyanate compound was previously reacted with the fluorine-containing copolymer before use.

UVI 6990 (trade name) represents a photo-induced acid-generating agent manufactured by Union Carbide Japan Co., Ltd.

IRG 907 (trade name) represents a radical polymerization initiator, manufactured by Ciba-Geigy.

DETX (trade name) represents a photosensitizing agent manufactured by Nippon Kayaku Co., Ltd.

TABLE 4

| Coating Liquid | Fluorine-containing polymer | Hardener | Catalyst to cure | Colloidal Silica |
|---|---|---|---|---|
| Ln1 | P-1 (100) | | UVI6990 (6) | |
| Ln2 | P-1 (70) | | UVI6990 (6) | (30) |
| Ln3 | P-1 (70) | TEOS sol(30) | UVI6990 (6) | |
| Ln4 | P-19 (70) | | UVI6990 (6) | (30) |
| Ln5 | P-20 (70) | | UVI6990 (6) | (30) |
| Ln6 | P-38 (70) | | UVI6990 (6) | (30) |
| Ln7 | P-42 (70) | | UVI6990 (6) | (30) |
| Ln8 | P-27 (56) | SiNCO(14) | UVI6990 (6) | (30) |
| Ln9 | P-5 (100) | | UVI6990 (6) | |
| Ln10 | P-5 (80) | | UVI6990 (6) | (20) |
| Ln11 | P-6 (70) | OXT221(30) | UVI6990 (6) | |
| Ln12 | P-31 (70) | | UVI6990 (6) | (30) |
| Ln13 | P-13 (100) | | IRG907 (6) DETX (2) | |
| Ln14 | P-15 (100) | | IRG907 (6) DETX (2) | |
| Ln15 | P-33 (80) | DPHA(20) | 1RG907 (6) DETX (2) | |
| Ln16 | P-27 (56) | CYMEL 303 (14) | p-toluene sulfonic acid (2) | (30) |
| Ln17 | P-27 (56) | TAKENATE D110 (14) | Dibutyl tin dilaulate (1) | (30) |
| Ln18 (Comparative example 1) | Compound for comparison 6 (100) | | UVI6990 (6) | |
| Ln19 (Comparative example 2) | Compound for comparison 6 (70) | | UVI6990 (6) | (30) |
| Ln20 (Comparative example 3) | Compound for comparison 5 (80) | CYMEL 303 (20) | p-toluene sulfonic acid (2) | |
| Ln21 (Comparative example 4) | Compound for comparison 5 (56) | CYMEL 303 (14) | p-toluene sulfonic acid (2) | (30) |
| Ln22 (Comparative example 5) | Compound for comparison 1 (100) | | UVI6990 (6) | |
| Ln23 (Comparative example 6) | Compound for comparison 3 (100) | | UVI6990 (6) | |
| Ln24 (Comparative example 7) | Compound for comparison 7 (100) | | IRG907 (6) DETX (2) | |

Preparation of a Coating Liquid for 1st Layer (Hard Coating Layer)

A mixture of dipentaerythritol pentaacrylate and dipentaerythritol hexaacrylate (DPHA (trade name), manufactured by Nippon Kayaku Co., Ltd.) (125 g), together with urethane acrylate oligomer (UV-6300 B (trade name), manufactured by The Nippon Synthetic Chemical Industry Co., Ltd.) (125 g), were dissolved in an industrially modified ethanol (439 g). To the obtained mixture, a solution prepared by dissolving 7.5 g of a photo-polymerization initiator (Irgacure 907 (trade name), manufactured by Ciba-Geigy) and 5.0 g of a photosesitizer (Kayacure DETX (trade name), manufactured by Nippon Kayaku Co., Ltd.) in 49 g of methyl ethyl ketone was added. The thus-prepared mixture was stirred, and filtered through 1 μm mesh, to prepare a coating liquid for a hard coating layer.

Preparation of Titanium Dioxide Dispersion 30 mass parts of fine particles of titanium dioxide having a core/shell structure (TTO-55B (trade name), manufactured by Ishihara Sangyo Co., Ltd.), 4.5 mass parts of an anionic diacrylate monomer (PM 21 (trade name), manufactured by Nippon Kayaku Co., Ltd.), 0.3 mass part of a cationic methacrylate monomer (DMAEA (trade name), manufactured by Kohjin Co., Ltd.) and 65.2 mass parts of methyl ethyl ketone were dispersed, by means of a sand grinder, to prepare a dispersion of titanium dioxide.

Preparation of a Coating Liquid for 2nd Layer (Middle-Refractive-Index Layer)

0.14 g of a photo-polymerization initiator (Irgacure 907 (trade name), manufactured by Ciba-Geigy) and 0.04 g of a photosesitizer (Kayacure DETX (trade name), manufactured by Nippon Kayaku Co., Ltd.) were dissolved in 151.9 g of cyclohexanone and 37.0 g of methyl ethyl ketone. To the obtained solution, a mixture of 6.1 g of the above titanium dioxide dispersion and 2.4 g of a mixture of dipentaerythritol pentaacrylate and dipentaerythritol hexaacrylate (DPHA, manufactured by Nippon Kayaku Co., Ltd.) was added, and stirred at room temperature for 30 minutes. The liquid was filtered through 1 μm mesh, to prepare a coating liquid for a middle-refractive-index layer.

Preparation of a Coating Liquid for 3rd Layer (High-Refractive-Index Layer)

0.06 g of a photo-polymerization initiator (Irgacure 907 (trade name), manufactured by Ciba-Geigy) and 0.02 g of a photosesitizer (Kayacure DETX (trade name), manufactured by Nippon Kayaku Co., Ltd.) were dissolved in 152.8 g of cyclohexanone and 37.2 g of methyl ethyl ketone. To the obtained solution, 13.13 g of the titanium dioxide dispersion and 0.76 g of a mixture of dipentaerythritol pentaacrylate and dipentaerythritol hexaacrylate (DPHA (trade name), manufactured by Nippon Kayaku Co., Ltd.) were added, and stirred at room temperature for 30 minutes. The resulting liquid was filtered through 1 μm mesh filter, to prepare a coating liquid for a high-refractive-index layer.

Production of an Anti-Reflection Film

On a triacetyl cellulose film (TAC-TD80U (trade name), manufactured by Fuji Photo Film Co., Ltd.) having 80 μm thickness, a gelatin-undercoating layer was provided. The above-described coating liquid for a hard coating layer was applied, on the gelatin-undercoating layer, with a bar coater, dried at 120° C., and irradiated with UV light under a $N_2$ atmosphere, to harden the coated layer. Thus, a hard coat layer having 7.5 μm thickness was formed.

Then, the above-described coating liquid for a middle-refractive-index layer was applied on the hard coat layer with a bar coater, dried at 120° C., and irradiated with UV light under a $N_2$ atmosphere, to harden the coated layer. Thus, a middle-refractive-index layer (refractive index: 1.72, thickness: 81 nm) was formed. Then, the above-described coating liquid for a high-refractive-index layer was applied on the middle-refractive-index layer with a bar coater, dried at 120° C., and irradiated with UV light to harden the coated layer. Thus, a high-refractive-index layer (refractive index: 1.92, thickness: 53 nm) was formed. Further, any one of the coating liquids for a low-refractive-index layer presented in the above Table 4 (Ln1 to Ln15 (the present invention), and Ln18, Ln19 and Ln22 to Ln24 (Comparative Example)) was applied on the high-refractive-index layer with a bar coater so that a thickness of the low-refractive-index layer was 85 nm, and irradiated with UV light under a $N_2$ atmosphere, and additionally dried at 120° C. for 10 minutes, to form a low-refractive-index layer. Similarly, any one of the coating liquids for a low-refractive-index layer presented in the above Table 4 (Ln16 and 17 (the present invention), and Ln20 and 21 (Comparative Examples)) was applied on the high-refractive-index layer with a bar coater so that a thickness of the low-refractive-index layer was 85 nm, and additionally dried at 120° C. for 10 minutes, to form a low-refractive-index layer.

Evaluation of Prepared Films with Respect to Their Properties

The thus-obtained films having coated 1st to 4th layers (Examples 1 to 17 of the present invention and Comparative examples 1 to 7) were evaluated with respect to the following properties:

(1) Average Reflectance

A spectral reflectance at an incidence of 5 degree in the wavelength of 380 nm to 780 nm was measured, by means of a spectrophotometer (manufactured by JASCO Corporation). The thus-obtained results are presented in terms of an average mirror reflectance in the wavelength of 450 nm to 650 nm.

(2) Evaluation of Pencil Hardness

The anti-reflection film was humidified under the conditions of 25° C. and 60% RH for 2 hours. Thereafter, pencil hardness was evaluated according to the evaluation method of the pencil hardness specified by JIS-K-5400.

(3) Scratch Resistance Test

0000 steel wool under a loading condition of 200 g/cm$^2$ was reciprocated 1 time on the surface of the film. A state of scratch occurring at that time was observed and evaluated according to the following three grades:

◯: There was no scratch.

Δ: There were observed small scratches.

X: There were observed conspicuous scratches.

(4) Evaluation of Adhesive Property

A stripping test on the squares of a checkerboard using a Cellotape (registered trademark) was carried out according to JIS-K-5400. The number (x) of measures remaining without being stripped by the tape, per 100 of divided measures was mentioned as a ratio of x/100.

The results obtained are shown in Table 5.

TABLE 5

| | Low-refractive-index layer Coating Liquid | Low-refractive-index layer Refractive Index | Average Reflectance | Pencil Hardness | Scratch Resistance | Adhesive Property |
|---|---|---|---|---|---|---|
| Example (1) | Ln1 | 1.388 | 0.29 | 2H | ○ | 100/100 |
| Example (2) | Ln2 | 1.405 | 0.31 | 3H | ○ | 100/100 |
| Example (3) | Ln3 | 1.415 | 0.31 | 3H | ○ | 100/100 |
| Example (4) | Ln4 | 1.400 | 0.31 | 3H | ○ | 100/100 |
| Example (5) | Ln5 | 1.391 | 0.30 | 3H | ○ | 100/100 |
| Example (6) | Ln6 | 1.408 | 0.31 | 3H | ○ | 100/100 |
| Example (7) | Ln7 | 1.399 | 0.31 | 3H | ○ | 100/100 |
| Example (8) | Ln8 | 1.412 | 0.32 | 3H | ○ | 100/100 |
| Example (9) | Ln9 | 1.420 | 0.35 | 2H | ○ | 100/100 |
| Example (10) | Ln10 | 1.427 | 0.38 | 3H | ○ | 100/100 |
| Example (11) | Ln11 | 1.425 | 0.37 | 2H | ○ | 100/100 |
| Example (12) | Ln12 | 1.420 | 0.35 | 2H | ○ | 100/100 |
| Example (13) | Ln13 | 1.410 | 0.32 | 3H | ○ | 100/100 |
| Example (14) | Ln14 | 1.405 | 0.31 | 3H | ○ | 100/100 |
| Example (15) | Ln15 | 1.413 | 0.32 | 3H | ○ | 100/100 |
| Example (16) | Ln16 | 1.423 | 0.36 | 3H | ○ | 100/100 |
| Example (17) | Ln17 | 1.422 | 0.36 | 3H | ○ | 100/100 |
| Comparative example (1) | Ln18 | 1.403 | 0.31 | B | X | 70/100 |
| Comparative example (2) | Ln19 | 1.416 | 0.32 | H | Δ | 95/100 |
| Comparative example (3) | Ln20 | 1.424 | 0.38 | B | X | 80/100 |
| Comparative example (4) | Ln21 | 1.430 | 0.39 | H | Δ | 90/100 |
| Comparative example (5) | Ln22 | 1.431 | 0.40 | 2H | Δ | 100/100 |
| Comparative example (6) | Ln23 | 1.436 | 0.44 | B | X | 0/100 |
| Comparative example (7) | Ln24 | 1.405 | 0.32 | B | X | 0/100 |

As is apparent from the results in these Examples, it is understood that the anti-reflection films of the present invention provided very low surface reflectance in a wide wavelength region and also had a sufficient film-strength, and moreover they were excellent in adhesion to the substrate. On the other hand, it is understood that some of the Comparative examples somewhat improved reflectance to lower, but were poor in the points of film-strength and adhesion to the substrate.

Production of a Display Device Equipped with an Anti-Reflection Film

The thus-prepared anti-reflection films produced in Examples 1 to 17 and Comparative examples 1 to 7 were provided (mounted), respectively, onto a display surface of a liquid crystal display of a personal computer PC 9821NS/340W (trade name) available from Nippon Electric Co., Ltd., to produce surface display samples. The level of mirroring a background view on the surface of these produced samples owing to a surface reflection was evaluated by examination with the naked eye. There was almost no mirroring of a background view on the display devices equipped with the anti-reflection films produced in Examples 1 to 17 according to the present invention, so that the display image was easily observed. Further, these display devices according to the present invention had a sufficient surface mechanical strength. In contrast, even though the display devices equipped with the anti-reflection films produced in Comparative examples 1 to 7 reduced mirroring of a background view thereon to some extent, their surface mechanical strength was poor.

Example 3

Evaluation of an Anti-Reflection Film

Preparation of a Coating Liquid for a Low-Refractive-Index Layer

Coating liquids for a low-refractive-index layer (solid content 5% by mass) Ln 101 to 116 were each prepared, by mixing components presented in Table 6 below and then dissolving the resulting mixture in methyl ethyl ketone, respectively. A Figures in parentheses in Table 6 indicates a solid contents of each individual component in terms of part by mass.

Further, colloidal silica in Table 6 is MEK-ST (trade name) manufactured by Nissan Chemical Industries, Ltd.

PAG is the following compounds that generate an acid on the action of radiation.

PAG

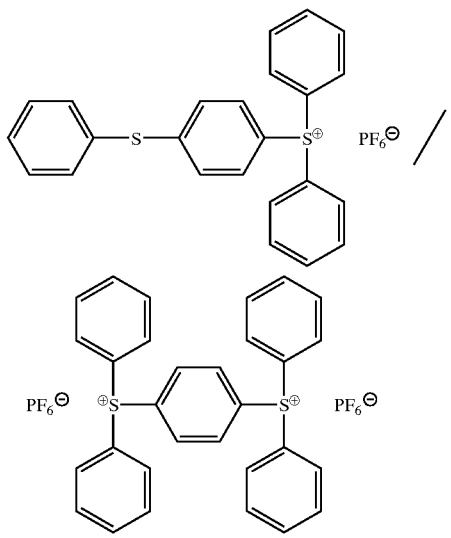

(A mixture of the above compounds in 1:1 (mass ratio))

A coating liquid for a low-refractive-index layer (solid content 5% by mass) Ln 117 (Comparative example 3-3) was prepared, by dissolving, in α, α, α, α', α', α'-hexafluorometaxylene, a mixture of the Comparative compounds 8 and 9 synthesized according to a method described in JP-A-11-337706.

Compound for comparison 8

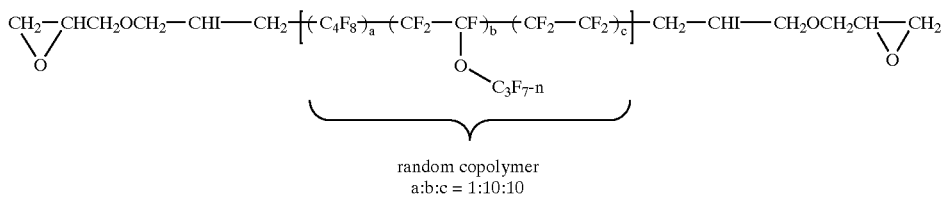

random copolymer
a:b:c = 1:10:10

Compound for Comparison 9

$BrCH_2—CFBrCOOCH_2CH_2(CF_2)_7CF_3$

TABLE 6

| Coating Liquid | Fluorine-containing polymer | Hardener | Catalyst to harden | Colloidal Silica |
|---|---|---|---|---|
| Ln101 | EP-1 (72) | EA-1 (8) | PAG (5) | (20) |
| Ln102 | EP-2 (49) | EA-1 (21) | PAG (5) | (30) |
| Ln103 | EP-5 (72) | EA-1 (8) | PAG (5) | (20) |
| Ln104 | EP-6 (49) | EA-1 (21) | PAG (5) | (30) |
| Ln105 | EP-8 (72) | EA-1 (8) | PAG (5) | (20) |
| Ln106 | EP-9 (72) | EA-1 (8) | PAG (5) | (30) |
| Ln107 | EP-15 (49) | EA-1 (21) | PAG (5) | (30) |
| Ln108 | EP-18 (49) | EA-1 (21) | PAG (5) | (30) |
| Ln109 | EP-23 (49) | EA-1 (21) | PAG (5) | (30) |
| Ln110 | EP-31 (49) | EA-1 (21) | PAG (5) | (30) |
| Ln111 | EP-5 (72) | EA-7 (8) | PAG (5) | (20) |
| Ln112 | EP-5 (72) | EA-8 (8) | PAG (5) | (20) |
| Ln113 | EP-5 (72) | EA-9 (8) | PAG (5) | (20) |
| Ln114 | EP-5 (72) | EA-17 (8) | PAG (5) | (20) |
| Ln115 | EP-5 (80) | | PAG (5) | (20) |

TABLE 6-continued

| Coating Liquid | Fluorine-containing polymer | Hardener | Catalyst to harden | Colloidal Silica |
|---|---|---|---|---|
| (Comparative example 3-1) Ln116 (Comparative example 3-2) | EP-5 (80) | EA-1 (20) | PAG (5) | |
| Ln117 (Comparative example 3-3) | Comparative compound 8 (77) | Comparative compound 9 (23) | | |

Preparation of a Coating Liquid for 1st Layer
(Hard Coat Layer)

A mixture of dipentaerythritol pentaacrylate and dipentaerythritol hexaacrylate (DPHA (trade name), manufactured by Nippon Kayaku Co., Ltd.) (125 g), together with urethane acrylate oligomer (UV-6300 B (trade name), manufactured by The Nippon Synthetic Chemical Industry Co., Ltd.) (125 g), were dissolved in an industrially modified ethanol (439 g). To the obtained mixture, a solution prepared by dissolving 7.5 g of a photo-polymerization initiator (Irgacure 907 (trade name), manufactured by Ciba-Geigy) and 5.0 g of a photosesitizer (Kayacure DETX (trade name), manufactured by Nippon Kayaku Co., Ltd.) in 49 g of methyl ethyl ketone, was added. The thus-prepared mixture was stirred, and filtered through 1 μm mesh filter, to prepare a coating liquid for a hard coat layer.

Preparation of Titanium Dioxide Dispersion 30 parts by mass of titanium dioxide (mass average particle diameter of primary particles: 50 nm, refractive index: 2.70), 4.5 parts by mass of an anionic diacrylate monomer (PM 21 (trade name), manufactured by Nippon Kayaku Co., Ltd.), 0.3 part by mass of a cationic methacrylate monomer (DMAEA (trade name), manufactured by Kohjin Co., Ltd.) and 65.2 parts by mass of methyl ethyl ketone were dispersed, by means of a sand grinder, to prepare a dispersion of titanium dioxide.

Preparation of a Coating Liquid for 2nd Layer
(Middle-Refractive-Index Layer)

0.14 g of a photo-polymerization initiator (Irgacure 907, manufactured by Ciba-Geigy) and 0.04 g of a photosesitizer (Kayacure DETX (trade name), manufactured by Nippon Kayaku Co., Ltd.) were dissolved, in 151.9 g of cyclohexanone and 37.0 g of methyl ethyl ketone. To the obtained solution, 6.1 g of the titanium dioxide dispersion, and 2.4 g of a mixture of dipentaerythritol pentaacrylate and dipentaerythritol hexaacrylate (DPHA, manufactured by Nippon Kayaku Co., Ltd.) were added and stirred at room temperature for 30 minutes. The liquid was filtered through 1 μm mesh filter, to prepare a coating liquid for a middle-refractive-index layer.

Preparation of a Coating Liquid for 3rd Layer (High-Refractive-Index Layer)

0.06 g of a photo-polymerization initiator (Irgacure 907, manufactured by Ciba-Geigy) and 0.02 g of a photosesitizer (Kayacure DETX, manufactured by Nippon Kayaku Co., Ltd.) were dissolved, in 152.8 g of cyclohexanone and 37.2 g of methyl ethyl ketone. To the obtained solution, 13.13 g of the titanium dioxide dispersion, and 0.76 g of a mixture of dipentaerythritol pentaacrylate and dipentaerythritol hexaacrylate (DPHA, manufactured by Nippon Kayaku Co., Ltd.) were added, and stirred at room temperature for 30 minutes. The liquid was filtered through 1 μm mesh filter, to prepare a coating liquid for a high-refractive-index layer.

above Table 6 was applied on the high-refractive-index layer with a bar coater so that a thickness of the low-refractive-index layer was 85 nm, dried at 120° C., and irradiated with UV light under a $N_2$ atmosphere, and additionally dried at 120° C. for 10 minutes, to form a low-refractive-index layer.

Evaluation of Prepared Films with Respect to Their Properties

The thus-obtained films having coated 1st to 4th layers (Examples 3-1 to 3-14 of the present invention and Comparative examples 3-1 to 3-3) were evaluated with respect to (1) average reflectance, (2) evaluation of pencil hardness, (3) scratch resistance test, and (4) evaluation of adhesive property, in the same manner as in the above-described Example 2.

The results obtained are shown in Table 7.

TABLE 7

| | Low-refractive-index layer Coating Liquid | Low-refractive-index layer Refractive Index | Average Reflectance | Pencil Hardness | Scratch Resistance | Adhesive Property |
|---|---|---|---|---|---|---|
| Example (3-1) | Ln101 | 1.429 | 0.55 | 2H | ◯ | 100/100 |
| Example (3-2) | Ln102 | 1.428 | 0.54 | 3H | ◯ | 100/100 |
| Example (3-3) | Ln103 | 1.426 | 0.51 | 3H | ◯ | 100/100 |
| Example (3-4) | Ln104 | 1.425 | 0.50 | 2H | ◯ | 100/100 |
| Example (3-5) | Ln105 | 1.436 | 0.59 | 3H | ◯ | 100/100 |
| Example (3-6) | Ln106 | 1.421 | 0.46 | 2H | ◯ | 100/100 |
| Example (3-7) | Ln107 | 1.425 | 0.49 | 3H | ◯ | 100/100 |
| Example (3-8) | Ln108 | 1.421 | 0.46 | 3H | ◯ | 100/100 |
| Example (3-9) | Ln109 | 1.418 | 0.43 | 2H | ◯ | 100/100 |
| Example (3-10) | Ln110 | 1.432 | 0.56 | 3H | ◯ | 100/100 |
| Example (3-11) | Ln111 | 1.431 | 0.56 | 3H | ◯ | 100/100 |
| Example (3-12) | Ln112 | 1.429 | 0.55 | 3H | ◯ | 100/100 |
| Example (3-13) | Ln113 | 1.433 | 0.56 | 3H | ◯ | 100/100 |
| Example (3-14) | Ln114 | 1.428 | 0.54 | 3H | ◯ | 100/100 |
| Comparative example (3-1) | Ln115 | 1.423 | 0.48 | H | X | 80/100 |
| Comparative example (3-2) | Ln116 | 1.418 | 0.43 | B | X | 85/100 |
| Comparative example (3-3) | Ln117 | 1.340 | 0.31 | B or softer | X | 30/100 |

Production of an Anti-Reflection Film

On a triacetyl cellulose film (TAC-TD80U (trade name), manufactured by Fuji Photo Film Co., Ltd.) having 80 μm thickness, a gelatin-undercoating layer was provided. The above-described coating liquid for a hard coating layer was applied on the gelatin-undercoating layer with a bar coater, dried at 120° C., and irradiated with UV light under a $N_2$ atmosphere, to harden the coated layer. Thus, a hard coat layer having 7.5 μm thickness was formed. Then, the above-described coating liquid for a middle-refractive-index layer was applied on the hard coat layer with a bar coater, dried at 120° C., and irradiated with UV light under a $N_2$ atmosphere to harden the coated layer. Thus, a middle-refractive-index layer (refractive index: 1.72, thickness: 0.081 μm) was formed. Then, the above-described coating liquid for a high-refractive-index layer was applied on the middle-refractive-index layer with a bar coater, dried at 120° C., and irradiated with UV light to harden the coated layer. Thus, a high-refractive-index layer (refractive index: 1.92, thickness: 0.053 μm) was formed. Further, any one of the coating liquids for a low-refractive-index layer presented in the As is apparent from the results in these Examples, it is understood that the anti-reflection films of the present invention provided very low surface reflectance in a wide wavelength region and also had a sufficient film-strength, and moreover they were excellent in adhesion to the substrate. On the other hand, it is understood that the comparative examples were poor in the points of film strength and adhesion to the substrate.

Production of a Display Device Equipped with the Anti-Reflection Film

Any one of the anti-reflection films produced in Examples 3-1 to 3-14 and Comparative examples 3-1 to 3-3 was provided on a display surface of a liquid crystal display of a personal computer PC 9821NS/340W (trade name) available from Nippon Electric Co., Ltd. Thus, surface display samples were produced. The level of mirroring a background view on the surface of these produced samples owing to a surface reflection was evaluated by examination with the naked eye. There was almost no mirroring of a background view on the display devices equipped with the anti-reflection films produced in Examples 3-1 to 3-14 according to the present invention, so that the display image was easily observed. Further, these display devices according to the present invention had a sufficient surface mechanical strength. In contrast, even though the display devices equipped with the anti-reflection films produced in Comparative examples 3-1 to 3-3 reduced mirroring of a background view thereon, their surface mechanical strength was poor.

Having described our invention as related to the present embodiments, it is our intention that the invention not be limited by any of the details of the description, unless otherwise specified, but rather be construed broadly within its spirit and scope as set out in the accompanying claims.

What we claim is:

1. A fluorine-containing copolymer represented by formula 1:

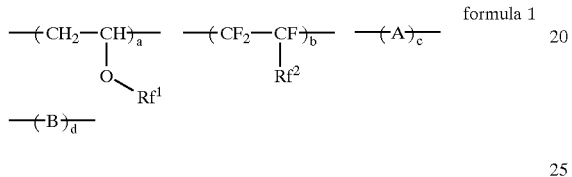

formula 1 wherein, in formula 1, $Rf^1$ represents a fluorine-containing alkyl group having a straight chain, branched chain, or alicyclic structure having 1 to 30 carbon atoms, which may contain an ether bond; $Rf^2$ represents a perfluoroalkyl group having 1 to 5 carbon atoms; A represents a constituent containing at least one reactive group that is capable of contributing to a cross-linking reaction; B represents an arbitrary constituent; a, b, c and d each represent a mole fraction (%) of each constituent, in which they satisfy the following conditions:

$55 \leq a+b \leq 95, 5 \leq a \leq 90, 5 \leq b \leq 70, 5 \leq c \leq 45, 0 \leq d \leq 40$.

2. The fluorine-containing copolymer according to claim 1, wherein $Rf^1$ in the formula 1 is represented by formula 2:

formula 2 wherein, in formula 2, $Rf^3$ represents a fluorine-containing alkyl group having a straight chain, branched chain, or alicyclic structure having 1 to 20 carbon atoms, which may contain an ether bond; p represents an integer of 0 to 5; and q represents 0 or 1.

3. The fluorine-containing copolymer according to claim 1, wherein $Rf^1$ in the formula 1 is represented by formula 3:

formula 3 wherein, in formula 3, R represents a hydrogen atom, or an alkyl group having 1 to 5 carbon atoms, which does or does not contain a fluorine atom, and may have an ether bond; $Rf^4$ represents a fluorine-containing alkyl group having a straight chain, branched chain, or alicyclic structure having 1 to 14 carbon atoms, which may contain an ether bond, and in which R and $Rf^4$ may bond together to form a ring; and r represents an integer of 0 to 5.

4. The fluorine-containing copolymer according to claim 1, wherein $Rf^1$ in the formula 1 is a perfluoroalkyl group.

5. The fluorine-containing copolymer according to claim 1, wherein A in the formula 1 represents a constituent of a copolymer represented by formula 4, 5, 6, 7 or 8:

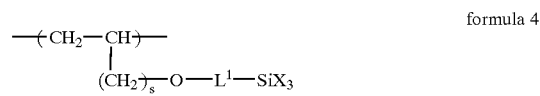

formula 4 wherein, in formula 4, $L^1$ represents an alkylene group having 1 to 20 carbon atoms, X represents a hydroxyl group or a hydrolysable group, and s represents 0 or 1;

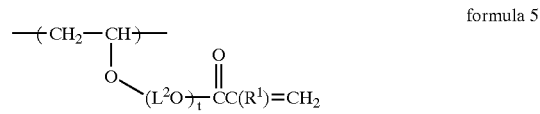

formula 5 wherein, in formula 5, $L^2$ represents a linking group having 1 to 20 carbon atoms, $R^1$ represents a hydrogen atom or a methyl group, and t represents 0 or 1;

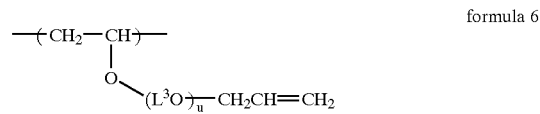

formula 6 wherein, in formula 6, $L^3$ represents a linking group having 1 to 20 carbon atoms, and u represents 0 or 1;

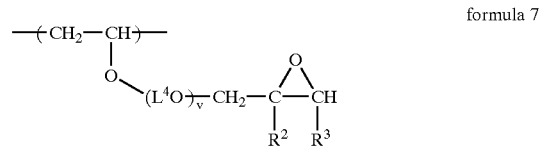

formula 7 wherein, in formula 7, $L^4$ represents a linking group having 1 to 20 carbon atoms, $R^2$ and $R^3$ each represent a hydrogen atom or a methyl group, and v represents 0 or 1;

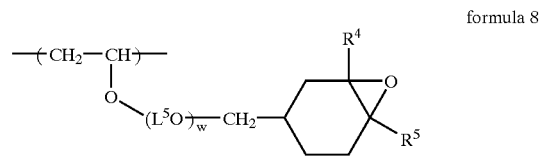

formula 8 wherein, in formula 8, $L^5$ represents a linking group having 1 to 20 carbon atoms, $R^4$ and $R^5$ each represent a hydrogen atom or a methyl group, and w represents 0 or 1.

6. The fluorine-containing copolymer according to claim 1, wherein said fluorine-containing copolymer is represented by formula 9:

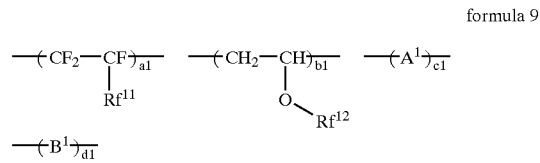

formula 9 wherein, in formula 9, $Rf^{11}$ represents a perfluoroalkyl group having 1 to 5 carbon atoms; $Rf^{12}$ represents a fluorine-containing alkyl group having a straight chain, branched chain, or alicyclic structure having 1 to 30 carbon atoms, which may have an ether bond; $A^1$ represents a constituent having at least one epoxy group; $B^1$ represents an arbitrary constituent; a1, b1, c1 and d1 each represent a mole fraction (%) of each constituent, in which they satisfy the following conditions:

$$55 \leq a1+b1 \leq 95, 5 \leq a1 \leq 70, 5 \leq b1 \leq 90, 5 \leq c1 \leq 45, 0 \leq d1 \leq 40.$$

7. A composition for forming a film, comprising the fluorine-containing copolymer according to claim 1.

8. The film-forming composition according to claim 7, wherein the fluorine-containing copolymer is represented by the formula 9, and wherein the film-forming composition contains a hardener having at least one epoxy group in a molecule, and fine particles, together with said fluorine-containing copolymer.

9. An anti-reflection film, having a low-refractive-index layer containing the fluorine-containing copolymer according to claim 1.

10. The anti-reflection film according to claim 9, wherein the fluorine-containing copolymer is represented by the formula 9;

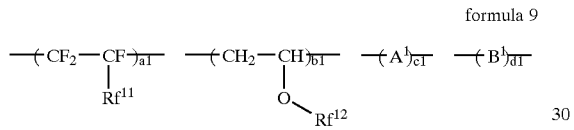

formula 9 wherein $Rf^{11}$ represents a perfluoroalkyl group having 1 to 5 carbon atoms; $Rf^{12}$ represents a fluorine-containing alkyl group having a straight chain, branched chain, or alicyclic structure having 1 to 30 carbon atoms, which may have an ether bond: $A^1$ represents a constituent having at least one epoxy group: $B^1$ represents an arbitrary constituent: a1, b2, c1 and d1 each represent a mole fraction (%) of each constituent, in which they satisfy the following conditions:

$$55 \leq a1+b \leq 95, 5 \leq a1 \leq 70, 5 \leq b1 \leq 90, 5 \leq c1 \leq 45, 0 \leq d1 \leq 40,$$

and wherein the anti-reflection film has a low-refractive-index layer formed by coating and hardening a film-forming composition, said composition containing said fluorine-containing copolymer, a hardener having at least one epoxy group in a molecule, and fine particles.

11. An anti-reflection film having the anti-reflection film according to claim 9, on a transparent support.

12. The anti-reflection film according to claim 11, wherein, in the fluorine-containing copolymer, $Rf^1$ in the formula 1 is represented by formula 2:

formula 2 wherein, in formula 2, $Rf^3$ represents a fluorine-containing alkyl group having a straight chain, branched chain, or alicyclic structure having 1 to 20 carbon atoms, which may contain an ether bond; p represents an integer of 0 to 5; and q represents 0 or 1.

13. The anti-reflection film according to claim 11, wherein, in the fluorine-containing copolymer, $Rf^1$ in the formula 1 is represented by formula 3:

formula 3 wherein, in formula 3, R represents a hydrogen atom, or an alkyl group having 1 to 5 carbon atoms, which does or does not contain a fluorine atom, and may have an ether bond; $Rf^4$ represents a fluorine-containing alkyl group having a straight chain, branched chain, or alicyclic structure having 1 to 14 carbon atoms, which may contain an ether bond, and in which R and $Rf^4$ may bond together to form a ring; and r represents an integer of 0 to 5.

14. The anti-reflection film according to claim 11, wherein, in the fluorine-containing copolymer, $Rf^1$ in the formula 1 is a perfluoroalkyl group.

15. The anti-reflection film according to claim 11, wherein, in the fluorine-containing copolymer, A in the formula 1 represents a constituent of a polymer represented by formula 4, 5, 6, 7 or 8:

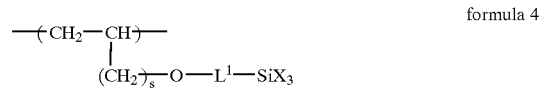

formula 4 wherein, in formula 4, $L^1$ represents an alkylene group having 1 to 20 carbon atoms, X represents a hydroxyl group or a hydrolysable group, and s represents 0 or 1;

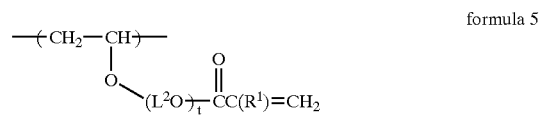

formula 5 wherein, in formula 5, $L^2$ represents a linking group having 1 to 20 carbon atoms, $R^1$ represents a hydrogen atom or a methyl group, and t represents 0 or 1;

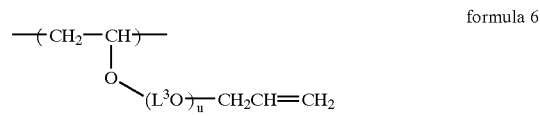

formula 6 wherein, in formula 6, $L^3$ represents a linking group having 1 to 20 carbon atoms, and u represents 0 or 1;

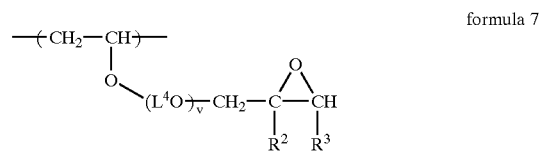

formula 7 wherein, in formula 7, $L^4$ represents a linking group having 1 to 20 carbon atoms, $R^2$ and $R^3$ each represent a hydrogen atom or a methyl group, and v represents 0 or 1;

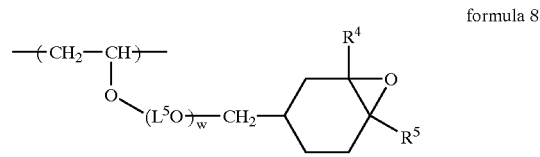

formula 8 wherein, in formula 8, $L^5$ represents a linking group having 1 to 20 carbon atoms, $R^4$ and $R^5$ each represent a hydrogen atom or a methyl group, and w represents 0 or 1.

16. The anti-reflection film according to claim 11, wherein the fluorine-containing copolymer is represented by the formula 9:

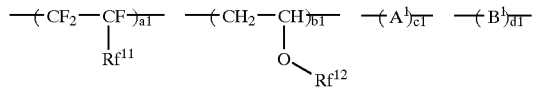

formula 9 wherein $Rf^{11}$ represents a perfluoroalkyl group having 1 to 5 carbon atoms; $Rf^{12}$ represents a fluorine-containing alkyl group having a straight chain, branched chain, or alicyclic structure having 1 to 30 carbon atoms, which may have an ether bond: $A^1$ represents a constituent having at least one epoxy group: $B^1$ represents an arbitrary constituent: a1, b1, c1 and d1 each represent a mole fraction (%) of each constituent, in which they satisfy the following conditions:

$$55 \leq a1+b1 \leq 95, 5 \leq a1 \leq 70, 5 \leq b1 \leq 90, 5 \leq c1 \leq 45, 0 \leq d1 \leq 40,$$

and wherein the anti-reflection film has, on the transparent support, an anti-reflection film having a low-refractive index layer formed by coating and hardening a film-forming composition, said composition containing said fluorine-containing copolymer, a hardener having at least one epoxy group in a molecule, and fine particles.

17. The anti-reflection film according to claim 16, wherein the epoxy group-containing hardener is a compound having 3 to 10 glycidyl groups per molecule.

18. The anti-reflection film according to claim 16, wherein the fine particles are at least one kind of fine particles selected from the group consisting of $MgF_2$, $Na_3AlF_6$, a metal oxide, and silica.

19. A display device, comprising the anti-reflection film according to claim 11.

20. The display device according to claim 19, wherein the fluorine-containing copolymer is represented by the formula 9:

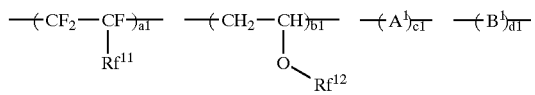

formula 9 wherein in formula 9, $Rf^{11}$ represents a perfluoroalkyl group having 1 to 5 carbon atoms: $Rf^{12}$ represents a fluorine-containing alkyl group having a straight chain, branched chain, or alicyclic structure having 1 to 30 carbon atoms, which may have an ether bond: $A^1$ represents a constituent having at least one epoxy group: $B^1$ represents an arbitrary constituent: a1, b1, c1 and d1 each represent a mole fraction (%) of each constituent, in which they satisfy the following conditions:

$$55 \leq a1+b1 \leq 95, 5 \leq a1 \leq 70, 5 \leq b1 \leq 90, 5 \leq c1 \leq 45, 0 \leq d1 \leq 40,$$

and wherein the display device has the anti-reflection film having, on a transparent support, an anti-reflection film having a low-refractive-index layer formed by coating and hardening a film-forming composition, said composition containing said fluorine-containing copolymer, a hardener having at least one epoxy group in a molecule, and fine particles.

* * * * *